United States Patent
Walker et al.

(10) Patent No.: US 10,632,713 B2
(45) Date of Patent: Apr. 28, 2020

(54) REPLACEABLE HARDFACING

(71) Applicant: Schlumberger Technology Corporation, Sugar Land, TX (US)

(72) Inventors: Stuart David Dixon Walker, Bristol (GB); Fabio Cappi, Vanvikan (NO); Are Funderud, Trondheim (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 215 days.

(21) Appl. No.: 15/579,960

(22) PCT Filed: Jun. 7, 2016

(86) PCT No.: PCT/US2016/036251
§ 371 (c)(1),
(2) Date: Dec. 6, 2017

(87) PCT Pub. No.: WO2016/200832
PCT Pub. Date: Dec. 15, 2016

(65) Prior Publication Data
US 2018/0229467 A1      Aug. 16, 2018

Related U.S. Application Data

(60) Provisional application No. 62/172,769, filed on Jun. 8, 2015, provisional application No. 62/210,941, filed on Aug. 27, 2015.

(51) Int. Cl.
*B32B 3/30*       (2006.01)
*E21B 17/10*      (2006.01)
(Continued)

(52) U.S. Cl.
CPC .................. *B32B 3/30* (2013.01); *B32B 7/08* (2013.01); *B32B 7/12* (2013.01); *C04B 35/5626* (2013.01);
(Continued)

(58) Field of Classification Search
CPC ........................................................ B32B 3/30
USPC ........................................................ 428/172
See application file for complete search history.

(56) References Cited

U.S. PATENT DOCUMENTS 4,156,374 A     5/1979   Shwayder
5,361,859 A    11/1994   Tibbitts
(Continued)

FOREIGN PATENT DOCUMENTS

CN      103410447 A    11/2013
CN      203978290 U    11/2013

OTHER PUBLICATIONS

International Preliminary Report on Patentability issued in International Patent application PCT/US2016/036251, dated Dec. 21, 2017, 10 pages.
(Continued)

*Primary Examiner* — Brent T O'Hern

(57) ABSTRACT

A tool can include a substrate with a support surface and at least one mechanical registration feature. The tool can also include a removable wear material including a matrix material. The removable wear material can include a matrix material shaped to be received by the at least one mechanical registration feature of the substrate. The removable wear material can be attached to the substrate so that the at least one mechanical registration feature registers the removable wear material.

20 Claims, 22 Drawing Sheets

(51) Int. Cl.
  *E21B 10/62* (2006.01)
  *B32B 7/08* (2019.01)
  *B32B 7/12* (2006.01)
  *C04B 35/56* (2006.01)
  *E21B 4/00* (2006.01)

(52) U.S. Cl.
  CPC ............ *E21B 4/003* (2013.01); *E21B 10/62* (2013.01); *E21B 17/1035* (2013.01); *E21B 17/1078* (2013.01); *E21B 17/1085* (2013.01); *B32B 2250/02* (2013.01)

(56) References Cited

U.S. PATENT DOCUMENTS

| | | | |
|---|---|---|---|
| 6,170,576 B1 | 1/2001 | Brunnert et al. | |
| 6,260,636 B1 | 7/2001 | Cooley et al. | |
| 8,590,130 B2 | 11/2013 | Zhang et al. | |
| 2013/0306380 A1* | 11/2013 | Oesterberg | E21B 10/32 175/263 |
| 2015/0275589 A1 | 10/2015 | Walker et al. | |

OTHER PUBLICATIONS

First Office Action issued in Chinese Patent Application 201680033233.9 dated Dec. 5, 2018, 16 pages.
International Search Report and Written Opinion issued in International Patent application PCT/US2016/036251, dated Oct. 31, 2016. 13 pages.
Second Office Action issued in Chinese Patent Application 201680033233.9 dated Aug. 2, 2019, 12 pages.

* cited by examiner

REPLACEABLE HARDFACING

CROSS-REFERENCE TO RELATED APPLICATIONS

The present application claims priority to and the benefit of U.S. Provisional Patent Application No. 62/172,769 filed on Jun. 8, 2015 and U.S. Provisional Patent Application No. 62/210,941 filed on Aug. 27, 2015, the disclosure of both of which are incorporated herein by reference in their entireties.

BACKGROUND

Oil wells are created by drilling a hole into the earth, in some cases using a drilling rig that rotates a drill string (e.g., drill pipe) having a drill bit attached thereto. In other cases, the drilling rig does not rotate the drill bit. For example, the drill bit can be rotated down-hole. The drill bit, aided by the weight of pipes (e.g., drill collars) cuts into rock within the earth.

SUMMARY

In some embodiments, a tool includes a substrate with a support surface and at least one mechanical registration feature. The tool can also include a removable matrix hardface (e.g., a replaceable wear surface). The removable matrix wear surface can include a hardfacing material (e.g., a pre-molded hardfacing material) shaped to be received by the at least one mechanical registration feature of the substrate. The removable matrix wear surface can be mechanically attachable to the substrate so that the at least one mechanical registration feature registers the removable wear surface. The removable wear surface can also be mechanically detachable from the substrate when the removable wear surface is worn.

In some embodiments, a tool includes a substrate with a support surface and at least one mechanical registration feature. The tool can also include a removable matrix hardface (e.g., a replaceable wear surface). The removable wear surface can include a matrix material (e.g., a pre-molded hardfacing material) shaped to be received by the at least one mechanical registration feature of the substrate. The removable matrix wear surface can be attached to the substrate so that the at least one mechanical registration feature registers the removable wear surface.

In some embodiments, a tool includes a substrate with a support surface and at least one mechanical registration feature. The tool can include a first removable matrix hardface (e.g., a first replaceable wear surface). The first removable wear surface can include a matrix material (e.g., a pre-molded hardfacing material) shaped to be received by the at least one mechanical registration feature of the substrate. The first removable wear surface can be mechanically attachable to the substrate so that the at least one mechanical registration feature registers the first removable wear surface. The tool can also include a second removable matrix hardface (e.g., a second replaceable wear surface) to be registered by the substrate. The first removable wear surface and the second removable wear surface overlap when registered by the substrate.

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of Replaceable Hardfacing are described with reference to the following figures. The same numbers are used throughout the figures to reference like features and components.

DETAILED DESCRIPTION

Figure 1:
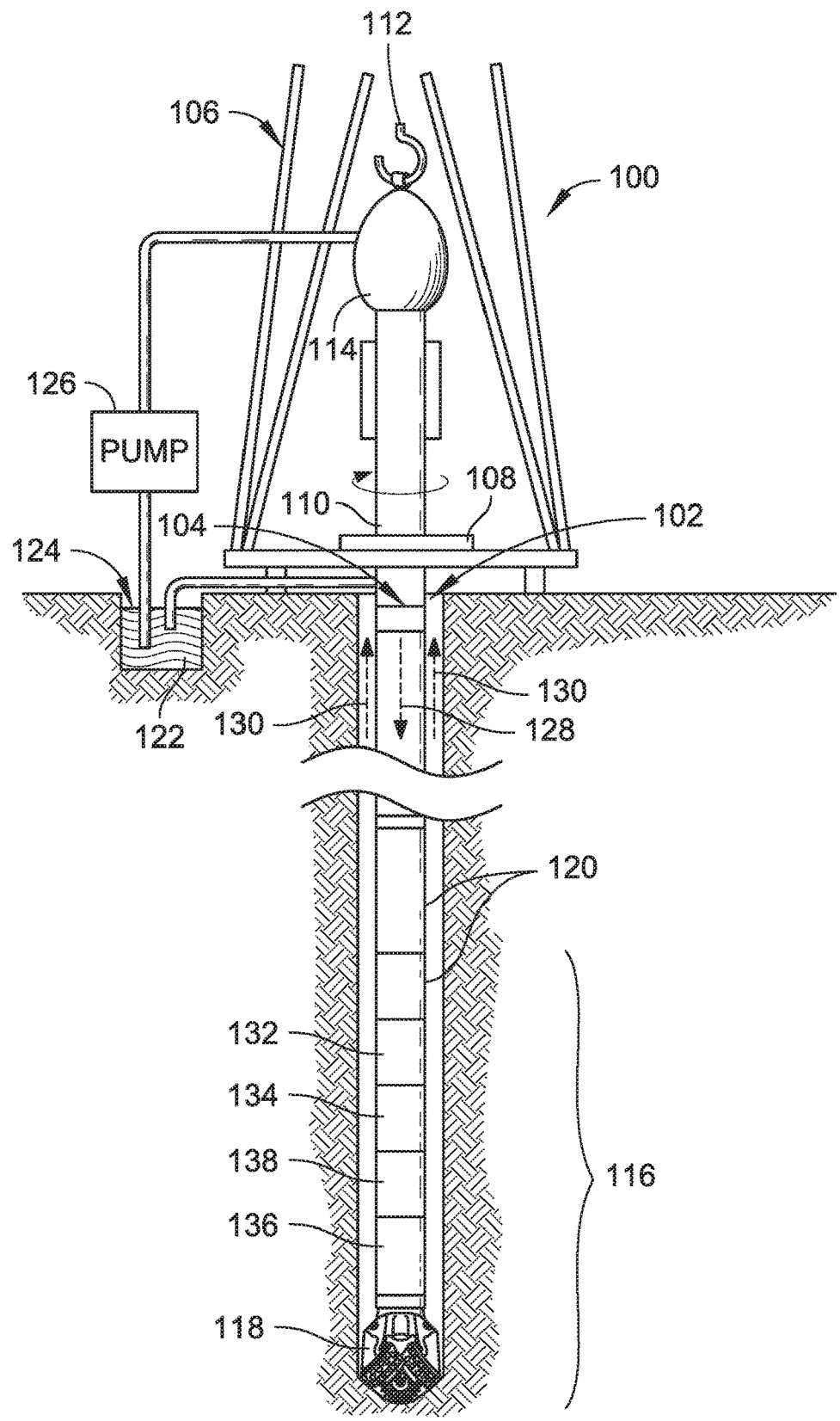
FIG. 1 illustrates an example system in which embodiments of Replaceable Hardfacing can be implemented.

In some systems, pads or bearing surfaces of a tool interact with the gage of the bore hole or to some internal structure that causes wear. These pads or bearing surfaces can include a hard material (e.g., hardfacing and/or a replaceable wear surface) that can increase the wear resistance of the pads or bearing surfaces. However, when the material is worn, the tool may no longer be able to function as intended. Thus, when a tool wear surface sees excessive wear, the useful life of the tool has ended, though other components of the tool remain operational.

The present disclosure relates to tools or portions of tools or components of tools that include removable hardfacing (e.g., replaceable wear surfaces). As described herein, the tools can be used in highly abrasive environments, and for various applications, including, but not necessarily limited to: drilling applications, boring applications, mining applications, other applications that use hardfacing, and so forth. In some embodiments, the application and attachment of matrix hardfacing to a surface by keying and/or brazing is described. As the matrix hardfacing surface becomes worn, it can be removed, which may then be replaced with a new hardfacing surface.

The systems and techniques described herein can be used with equipment deployed in various environments where hardfacing material may be exposed to wearing away (e.g., abrasion) and/or other gradual destruction or diminution (e.g., erosion). For instance, hardfacing can erode when exposed to fluid flow and/or can be subject to abrasion when exposed to wear between mating parts. Example applications can include, but are not necessarily limited to, one or more of the following: radial bearings, wear bands, reamers, replaceable bit components, erosion sleeves, replaceable struts, pads, pistons, blade surfaces, and the like. For example, replaceable hardfacing can be used with bearings, including load bearings, bearings to reduce wear, and/or other bearing surfaces that experience relative motion.

In other examples, replaceable hardfacing can be used for removable and/or replaceable portions of working tools. For example, removable hardfacing can be used with removal portions of a bit (e.g., to house one or more sensors), replaceable bit blades, and so on. Removable hardfacing can also be used with earth working equipment, such as prongs for diggers, scraping surfaces for scrapers, and so forth. In this manner, portions of the working tools, including structural portions, can be replaced when worn down. In the example of a reamer, hardfacing can be used to provide gauge protection (e.g., with another material, such as a steel tool body, a steel blade, and so on). In a further example, removable hardfacing can be used as an erosion sleeve, e.g., surrounding one or more turbine blades in a power generation assembly.

As described herein, drilling applications are provided by way of example and are not meant to limit the present disclosure. In other embodiments, systems, techniques, and apparatus as described herein can be used with other down hole operations. Further, such systems, techniques, and apparatus can be used in other applications not necessarily related to down hole operations.

FIG. 1 depicts a wellsite system 100 in accordance with one or more embodiments of the present disclosure. The wellsite can be onshore or offshore. A borehole 102 is formed in subsurface formations by directional drilling. A drill string 104 extends from a drill rig 106 and is suspended within the borehole 102. In some embodiments, the wellsite system 100 implements directional drilling using a rotary steerable system (RSS). For instance, the drill string 104 is rotated from the surface, and down hole devices move the end of the drill string 104 in a desired direction. The drill rig 106 includes a platform and derrick assembly positioned over the borehole 102. In some embodiments, the drill rig 106 includes a rotary table 108, kelly 110, hook 112, rotary swivel 114, and so forth. For example, the drill string 104 is rotated by the rotary table 108, which engages the kelly 110 at the upper end of the drill string 104. The drill string 104 is suspended from the hook 112 using the rotary swivel 114, which permits rotation of the drill string 104 relative to the hook 112. However, this configuration is provided by way of example and is not meant to limit the present disclosure. For instance, in other embodiments a top drive system is used.

A bottom hole assembly (BHA) 116 is suspended at the end of the drill string 104. The bottom hole assembly 116 includes a drill bit 118 at its lower end. In embodiments of the disclosure, the drill string 104 includes a number of drill pipes 120 that extend the bottom hole assembly 116 and the drill bit 118 into subterranean formations. Drilling fluid (e.g., mud) 122 is stored in a tank and/or a pit 124 formed at the wellsite. The drilling fluid 122 can be water-based, oil-based, and so on. A pump 126 displaces the drilling fluid 122 to an interior passage of the drill string 104 via, for example, a port in the rotary swivel 114, causing the drilling fluid 122 to flow downwardly through the drill string 104 as indicated by directional arrow 128. The drilling fluid 122 exits the drill string 104 via ports (e.g., courses, nozzles) in the drill bit 118, and then circulates upwardly through the annulus region between the outside of the drill string 104 and the wall of the borehole 102, as indicated by directional arrows 130. In this manner, the drilling fluid 122 cools and lubricates the drill bit 118 and carries drill cuttings generated by the drill bit 118 up to the surface (e.g., as the drilling fluid 122 is returned to the pit 124 for recirculation). Further, destabilization of the rock in the wellbore can be at least partially prevented, the pressure of fluids inside the rock can be at least partially overcome so that the fluids do not enter the wellbore, and so forth.

In embodiments of the disclosure, the drill bit 118 includes one or more crushing and/or cutting implements, such as conical cutters and/or bit cones having spiked teeth (e.g., in the manner of a roller-cone bit). In this configuration, as the drill string 104 is rotated, the bit cones roll along the bottom of the borehole 102 in a circular motion. As they roll, new teeth come in contact with the bottom of the borehole 102, crushing the rock immediately below and around the bit tooth. As the cone continues to roll, the tooth then lifts off the bottom of the hole and a high-velocity drilling fluid jet strikes the crushed rock chips to remove them from the bottom of the borehole 102 and up the annulus. As this occurs, another tooth makes contact with the bottom of the borehole 102 and creates new rock chips. In this manner, the process of chipping the rock and removing the small rock chips with the fluid jets is continuous. The teeth intermesh on the cones, which helps clean the cones and enables larger teeth to be used. A drill bit 118 including a conical cutter can be implemented as a steel milled-tooth bit, a carbide insert bit, and so forth. However, roller-cone bits are provided by way of example and are not meant to limit the present disclosure. In other embodiments, a drill bit 118 is arranged differently. For example, the body of the drill bit 118 includes one or more polycrystalline diamond compact (PDC) cutters that shear rock with a continuous scraping motion.

In some embodiments, the bottom hole assembly 116 includes a logging-while-drilling (LWD) module 132, a measuring-while-drilling (MWD) module 134, a rotary steerable system 136, a motor, and so forth (e.g., in addition to the drill bit 118). The logging-while-drilling module 132 can be housed in a drill collar and can contain one or a number of logging tools. It should also be noted that more than one LWD module and/or MWD module can be employed (e.g. as represented by another logging-while-drilling module 138). In embodiments of the disclosure, the logging-while drilling modules 132 and/or 138 include capabilities for measuring, processing, and storing information, as well as for communicating with surface equipment, and so forth.

The measuring-while-drilling module 134 can also be housed in a drill collar, and can contain one or more devices for measuring characteristics of the drill string 104 and drill bit 118. The measuring-while-drilling module 134 can also include components for generating electrical power for the down hole equipment. This can include a mud turbine generator powered by the flow of the drilling fluid 122. However, this configuration is provided by way of example and is not meant to limit the present disclosure. In other embodiments, other power and/or battery systems can be employed. The measuring-while-drilling module 134 can include one or more of the following measuring devices: a direction measuring device, an inclination measuring device, and so on. Further, a logging-while-drilling module 132 and/or 138 can include one or more measuring devices, such as a weight-on-bit measuring device, a torque measuring device, a vibration measuring device, a shock measuring device, a stick slip measuring device, and so forth.

In some embodiments, the wellsite system 100 is used with controlled steering or directional drilling. For example, the rotary steerable system 136 is used for directional drilling. As used herein, the term "directional drilling" describes intentional deviation of the wellbore from the path it would naturally take. Thus, directional drilling refers to steering the drill string 104 so that it travels in a desired direction. In some embodiments, directional drilling is used for offshore drilling (e.g., where multiple wells are drilled from a single platform). In other embodiments, directional drilling enables horizontal drilling through a reservoir, which enables a longer length of the wellbore to traverse the reservoir, increasing the production rate from the well. Further, directional drilling may be used in vertical drilling operations. For example, the drill bit 118 may veer off of a planned drilling trajectory because of the unpredictable nature of the formations being penetrated or the varying forces that the drill bit 118 experiences. When such deviation occurs, the wellsite system 100 may be used to guide the drill bit 118 back on course.

The drill string 104 can include one or more extendable displacement mechanisms, such as a piston mechanism that can be actuated by an actuator to displace a pad toward, for instance, a borehole wall to cause the bottom hole assembly 116 to move in a desired direction of deviation. In embodiments of the disclosure, a displacement mechanism can be actuated by the drilling fluid 122 routed through the drill string 104. For example, the drilling fluid 122 is used to move a piston, which changes the orientation of the drill bit 118 (e.g., changing the drilling axis orientation with respect to a longitudinal axis of the bottom hole assembly 116). The displacement mechanism may be employed to control a directional bias and/or an axial orientation of the bottom hole assembly 116. Displacement mechanisms may be arranged, for example, to point the drill bit 118 and/or to push the drill bit 118. In some embodiments, a displacement mechanism is deployed by a drilling system using a rotary steerable system 136 that rotates with a number of displacement mechanisms. It should be noted that the rotary steerable system 136 can be used in conjunction with stabilizers, such as non-rotating stabilizers, and so on.

In some embodiments, a displacement mechanism can be positioned proximate to the drill bit 118. However, in other embodiments, a displacement mechanism can be positioned at various locations along a drill string, a bottom hole assembly, and so forth. For example, in some embodiments, a displacement mechanism is positioned in a rotary steerable system 136, while in other embodiments, a displacement mechanism can be positioned at or near the end of the bottom hole assembly 116 (e.g., proximate to the drill bit 118). In some embodiments, the drill string 104 can include one or more filters that filter the drilling fluid 122 (e.g., upstream of the displacement mechanism with respect to the flow of the drilling fluid 122).

In some embodiments, the piston may actuate a pad, and e.g., push the pad about a hinge into the formation to push the drill bit. In some embodiments, the piston itself may be actuated and pushed into the formation to push the drill bit. In both of these embodiments, the pad or piston tool may employ replaceable wear surfaces in accordance with one or more embodiments of the present application.

Figure 2:
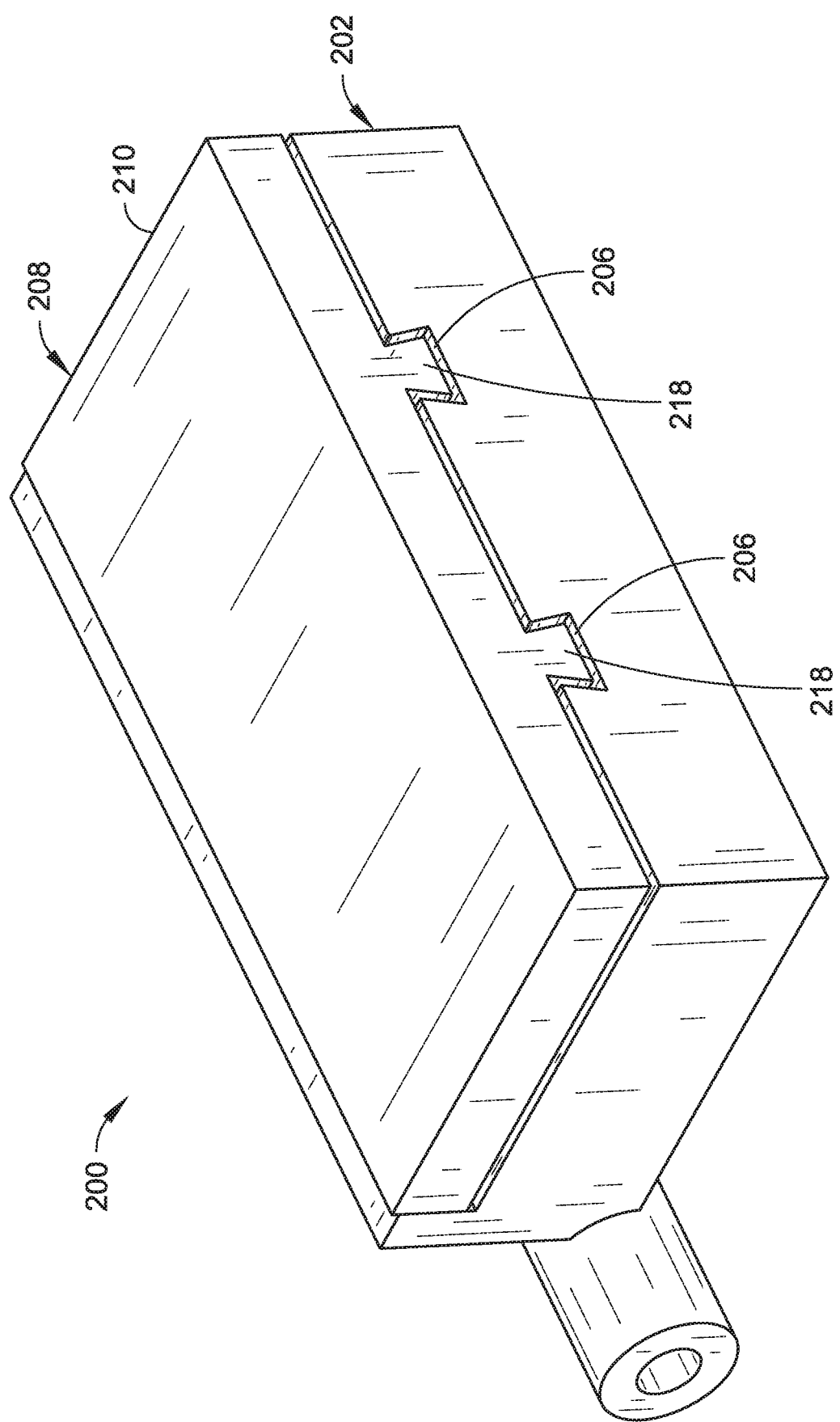
FIG. 2 is a perspective view illustrating various components of an example device that can implement embodiments of Replaceable Hardfacing.
Figure 3:
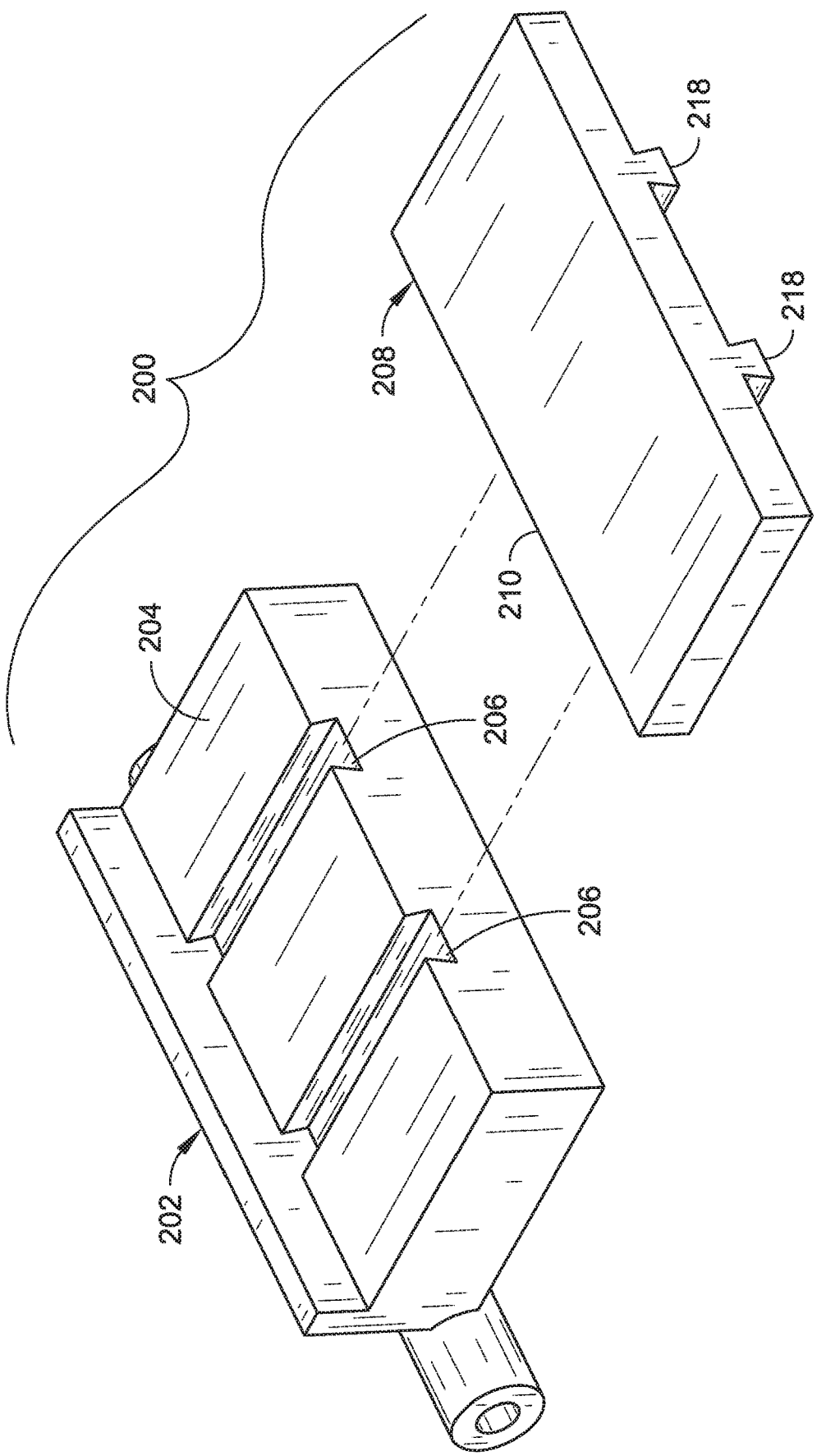
FIG. 3 is an exploded perspective view of the components illustrated in FIG. 2.
Figure 4:
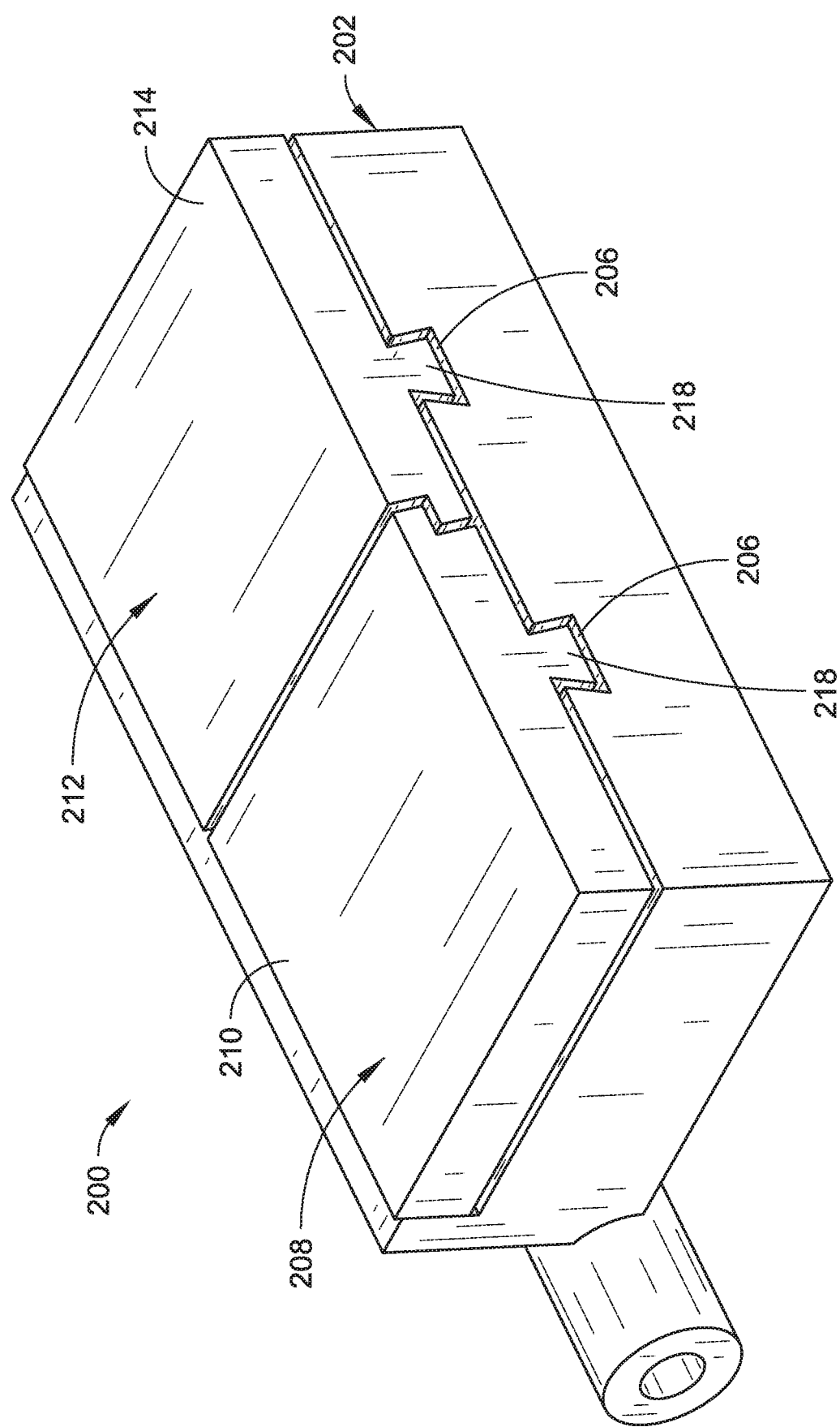
FIG. 4 is a partial perspective view illustrating various components of an example device that can implement embodiments of Replaceable Hardfacing.
Figure 8:
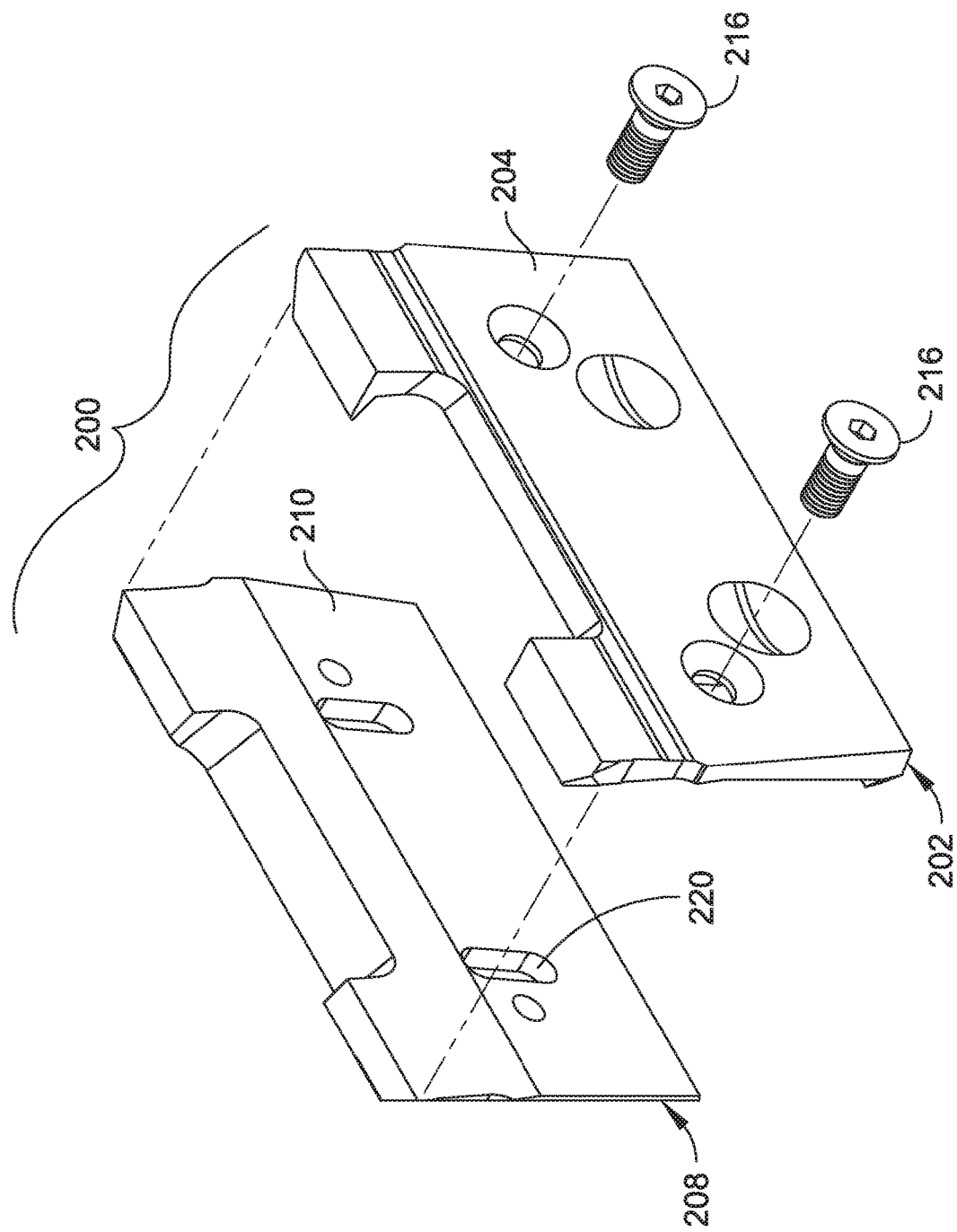
FIG. 8 is an isometric view illustrating various components of an example device that can implement embodiments of Replaceable Hardfacing.
Figure 9:
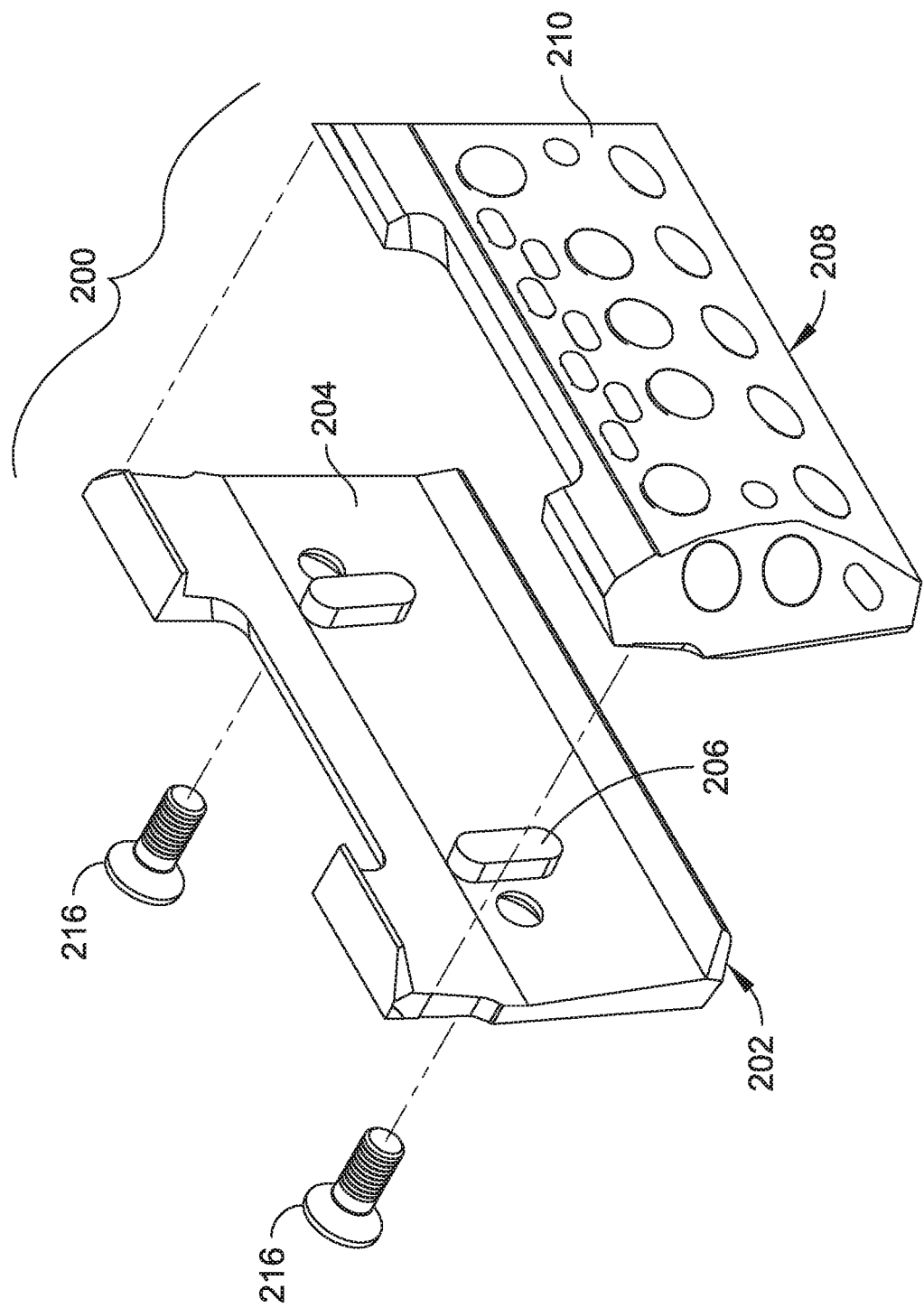
FIG. 9 is another isometric view of the components illustrated in FIG. 8.

Referring generally to FIGS. 2 through 22, tools in accordance with one or more embodiments of the present disclosure are described. A tool 200 includes a substrate 202 and one or more hardfaces (e.g., a first removable matrix hardface 208). The removable hardface may also be called a replaceable wear surface. The substrate 202 includes a support surface 204 (e.g., as shown in FIGS. 3, and 6 through 22) and one or more mechanical registration features 206 (e.g., as shown in FIGS. 2 through 4) for registering the first removable matrix hardface 208. In some embodiments, the substrate 202 is keyed for registering the first removable matrix hardface 208 (e.g., with a positive draft (e.g., as shown in FIGS. 8 and 9) and/or a negative draft (e.g., as shown in FIGS. 2 through 7)). The first removable matrix hardface 208 includes a hardfacing material (e.g., a pre-molded hardfacing material 210). The pre-molded hardfacing material 210 is shaped to be received by the mechanical registration feature 206 so that the first removable matrix hardface 208 is registered by the mechanical registration feature 206 and the first removable matrix hardface 208 can be attached (e.g., mechanically attached, brazed, attached using adhesive, etc.) to the substrate 202. The first removable matrix hardface 208 can be detached (e.g., mechanically detached, de-brazed and/or the adhesive removed, etc.) from the substrate 202 when the first removable matrix hardface 208 is worn. In some embodiments, the tool 200 also includes a second removable matrix hardface 212 that can be registered by the mechanical registration features 206.

Referring now to FIG. 2, a tool 200 can include a substrate 202 (e.g., a pad or bearing surface) and a first removable matrix hardface 208. The first removable matrix hardface 208 includes hardfacing material 210 (e.g., pre-molded hardfacing material), such as a block and/or profile of hardfacing. In some aspects the hardfacing material 210 includes a homogenous material throughout. In still other aspects, the pre-molded hardfacing material 210 is not machined. The hardfacing material 210 can include a hard metal, alloy, or other erosion or abrasion-resistant material including, but not necessarily limited to tungsten carbide, boron nitride, silicon carbide, and so forth. The pre-molded hardfacing material 210 can be pre-molded into various shapes, and may include inserts such as diamond (e.g., polycrystalline diamond (PCD), thermally stable polycrystalline diamond (TSP), natural diamond, etc.) or other ultra-hard materials such as polycrystalline boron nitride (PCBN). In some embodiments, the pre-molded hardfacing material 210 can be fabricated separately from the substrate 202 and attached in a simple operation. Further, the first removable matrix hardface 208 may later be removed (e.g., once it has worn) and replaced by a new piece of matrix hardface. In some embodiments, the first removable matrix hardface 208 can be made by infiltrating tungsten powder (e.g., tungsten and/or tungsten carbide) with a binder. In some embodiments, TSP bricks or wear buttons are placed in a mold and tungsten carbide powder is placed into the mold on top of and surrounding the TSP. An infiltrant is placed on top and is then heated to infiltrate the tungsten carbide to form the replaceable wear surface (e.g., including a tungsten carbide matrix material) that can be mated to a substrate.

In some embodiments, first removable matrix hardface 208 can be attached (i.e., mechanically attached) to the substrate 202. In some embodiments, attachment can include "keying" mating parts to provide registration. For example, the substrate 202 can be keyed with one or more registration features 206 for registering the first removable matrix hardface 208. The pre-molded hardfacing material 210 can include one or more tongues 218 that can be received by the mechanical registration features 206. In some embodiments, the substrate 202 and first removable matrix hardface 208 can be keyed with negative draft. For example, the first removable matrix hardface 208 can be slid onto the substrate 202, straight or helically (e.g. for stabilizer blades), as illustrated in FIG. 3.

Once mated, the substrate 202 and first removable matrix hardface 208 can be attached in various ways. In some embodiments, the first removable matrix hardface 208 can be attached by brazing into place with a braze for the two materials (e.g., a low-temperature braze). In some embodiments, a low-temperature braze used to join a first removable matrix hardface 208 to the substrate 202 is a braze having a melting temperature which is greater than an operating temperature of the tool (e.g., about 200° C.) and less than a temperature that could otherwise be damaging to a component (e.g., the substrate). For example, the braze can have a melting temperature of equal to or greater than about 450° C. up to about 1000° C. For example, the braze may have a melting temperature of between 450° C. and 1000° C., or in some embodiments between 500° C. and 800° C., or in some embodiments between 550° C. and 700° C. In some embodiments, the first removable matrix hardface 208 may be held in place by an adhesive (e.g., a glue, a cyanoacrylate, an epoxy, a hot melt, a silicone, a urethane, a solder, or the like). In these embodiments, the braze and/or the adhesive may be melted to remove the first removable matrix hardface 208 from the substrate 202 without damaging the substrate 202 (e.g., by melting the substrate 202) and/or without heat treating/tempering the substrate 202 (e.g., at a temperature of less than about 1000° C. for a metallic substrate, or 900° C., or other temperatures depending on the material used). It is to be understood that the use of braze and/or adhesive is offered by way of example and is not meant to be restrictive of the present disclosure. In other embodiments, the substrate 202 and the first removable matrix hardface 208 can be mechanically attached (e.g., with fasteners), as described herein. It is noted that the size, density, location, and so forth of tongue and groove configurations can be varied, or may have positive draft so the first removable matrix hardface 208 can be inserted in place face-to-face (e.g., without sliding along grooves). Further, in some embodiments, features can be included on the first removable matrix hardface 208 and/or substrate 202 to increase the surface area for a braze, such as faces between the two components that have circuitous mating surfaces (e.g., notches and tabs, serpentine paths, protrusions and/or pockets, and so forth).

Referring now to FIG. 4, the tool 200 can also include one or more additional removable matrix hardfaces (e.g., a second removable matrix hardface 212) including a hardfacing material 214 (e.g., a pre-molded hardfacing material). The second removable matrix hardface 212 can be recognized by the substrate 202 utilizing the techniques described above. For example, the hardfacing material 214 can be shaped to be received by a mechanical registration feature 206 of the substrate 202. Utilizing one or more additional removable matrix hardfaces can alleviate or reduce thermal strain resulting from a difference in coefficients of thermal expansion (CTE). Alleviating or reducing thermal strain can reduce or prevent cracking of the pre-molded hardfacing material 212, 214. Further, the pieces can cover (e.g., protect) the substrate 202 by having features that provide coverage for the substrate 202, such as overlapping features, and so forth. For example, the first removable matrix hardface 208 and the second removable matrix hardface 212 are to overlap when registered by the substrate 202. It is noted that an interface between multiple pieces can be configured to prevent and/or reduce the retention of matter (e.g., particulates) which may otherwise become lodged between the pieces during operation of the tool. For example, adjacent edges of two pieces can be beveled or chamfered to prevent a narrow gap from forming between the pieces. Further, one piece can include a close overlapping ledge which slides against another piece to lift the parts with respect to one another, rather than pushing against one another (e.g., in the manner of a scraper).

Figure 5:
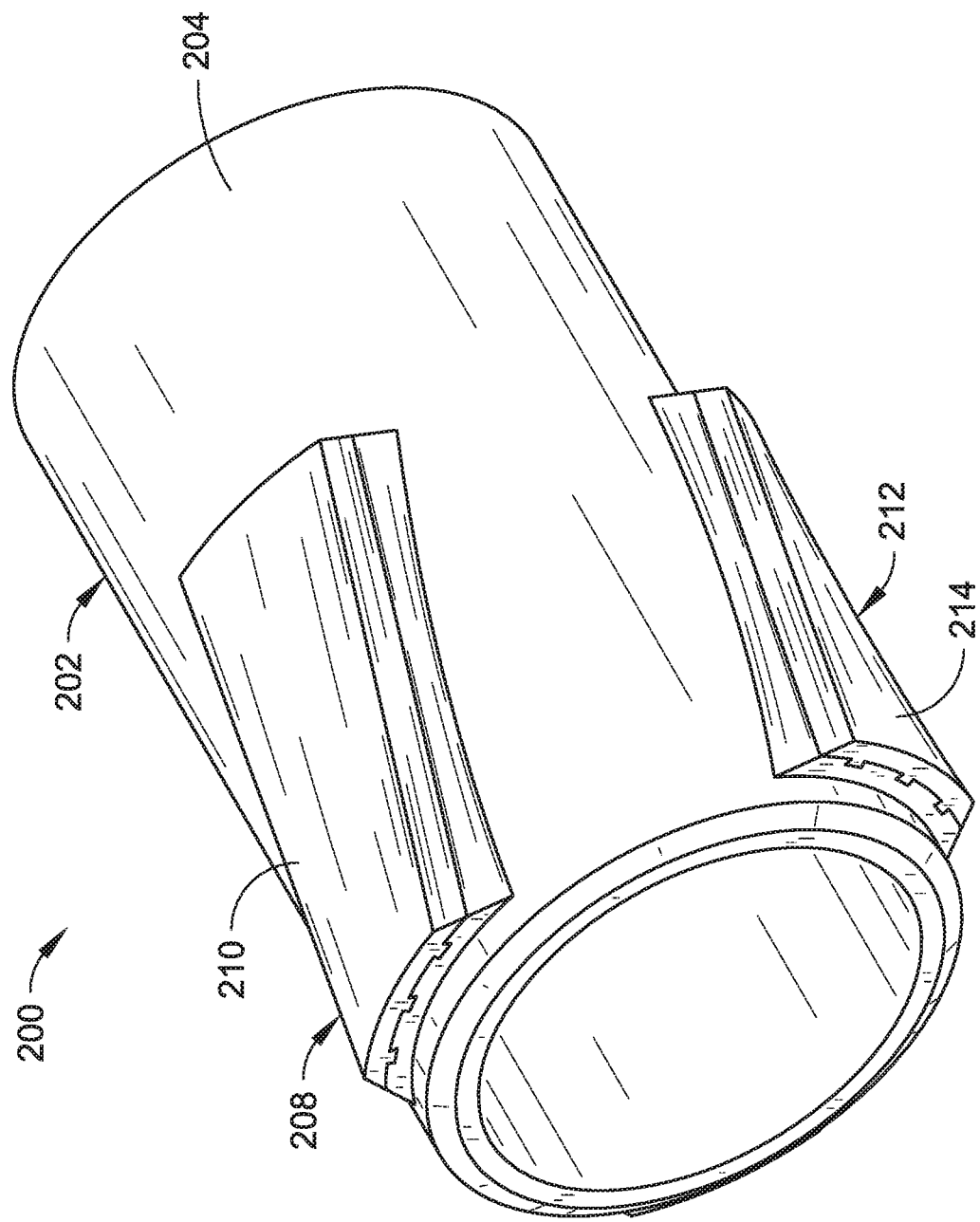
FIG. 5 is an isometric view illustrating various components of an example device that can implement embodiments of Replaceable Hardfacing.
Figure 6:
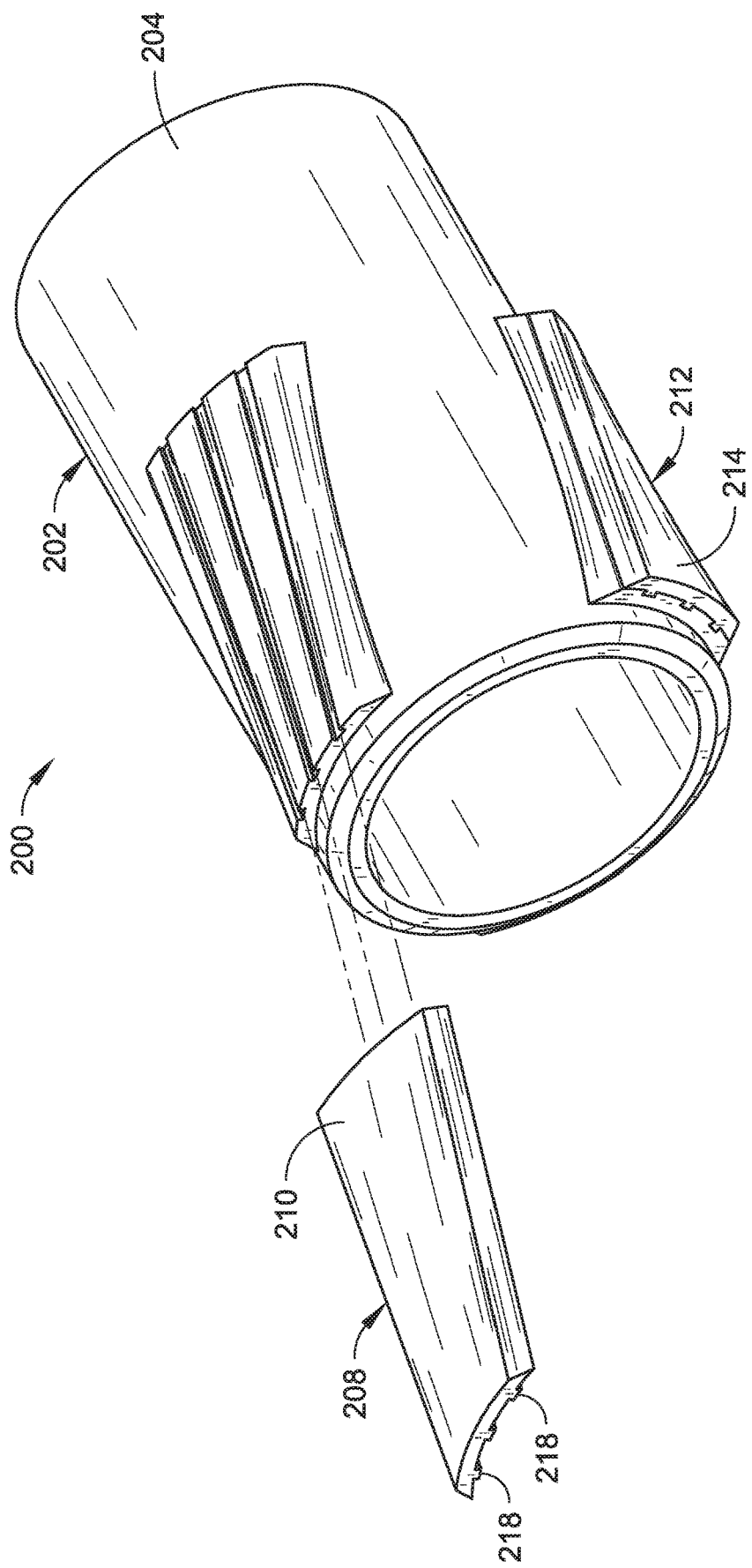
FIG. 6 is an exploded isometric view of the components illustrated in FIG. 5.
Figure 7:
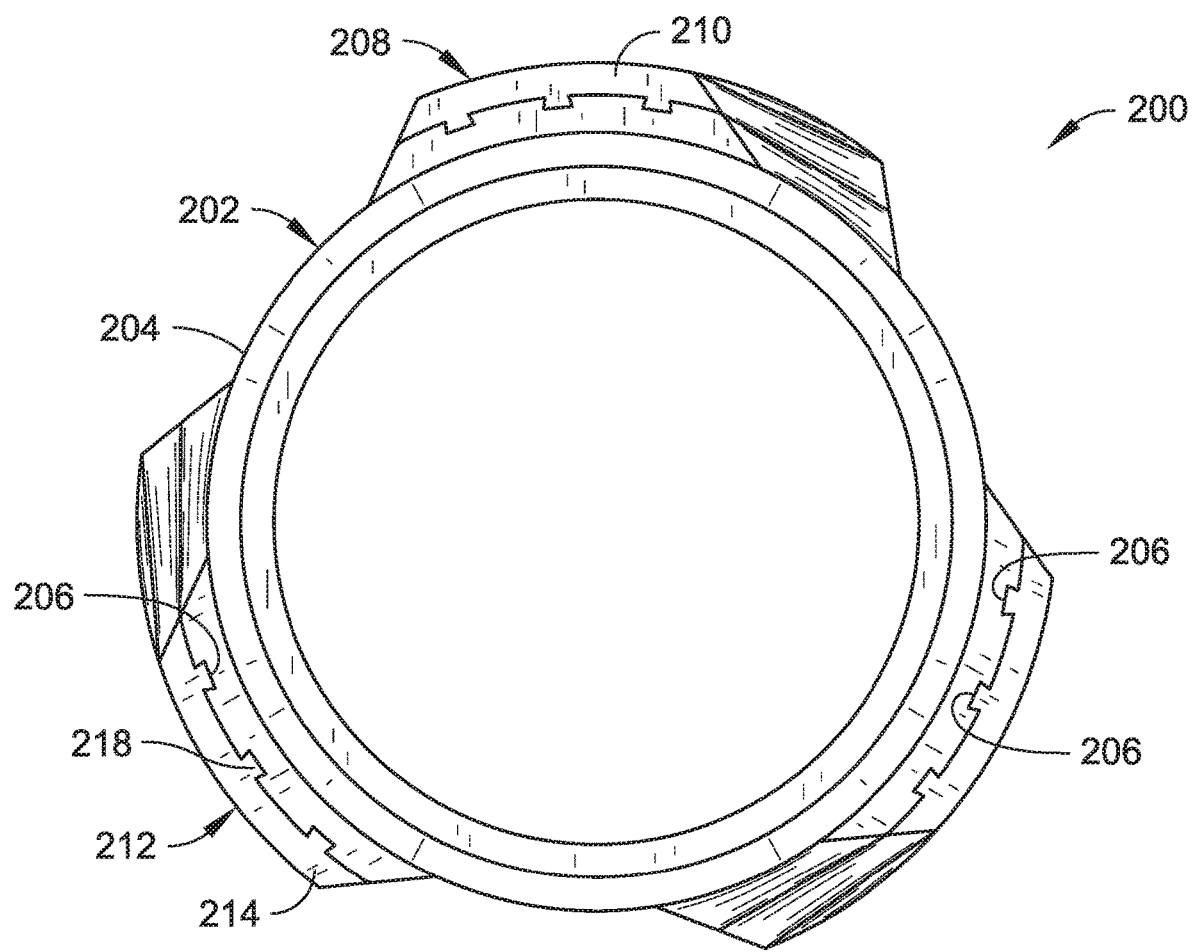
FIG. 7 is an end view of the components illustrated in FIG. 5.

Referring now to FIGS. 5 through 7, the techniques described herein can be applied to tools having non-planar surfaces, such as stabilizer blades having a helical profile. With reference to FIG. 5, a tool 200 including a stabilizer body is shown with a first replaceable wear surface 208 (e.g., first removable matrix hardface) and a second replaceable wear surface 212 (e.g., second removable matrix hardface). FIG. 6 shows the stabilizer body with the first removable matrix hardface 208 detached from the substrate 202, further illustrating that the first removable matrix hardface 208 includes tongues 218 that can be received by grooves on the substrate 202. In some embodiments, the substrate 202 can be keyed with a negative draft to register the removable matrix hardfaces 208, 212. For example, the substrate can include mechanical registration features 206 including grooves for receiving the tongues 218 of the removable matrix hardfaces 208, 212, as shown in FIG. 7. The tongue and groove configuration allows the removable matrix hardfaces 208, 212 to slidably engage the substrate 202. As noted above, the size, density, location, and so forth of the tongue and groove configurations can be varied, or may have positive draft so the removable matrix hardfaces 208, 212 can be inserted in place face-to-face (e.g., without sliding along grooves). In a similar manner as the thermal strain relief described above, the removable matrix hardfaces 208, 212 of the blade can be made in several pieces for strain relief and/or for ease of assembly. Dividing the blade can be beneficial to reduce the cost of manufacture (e.g., as smaller molds and furnaces can be used), reduce a risk of distortion for a complex and/or sensitive helical profile, and so forth.

Figure 10:
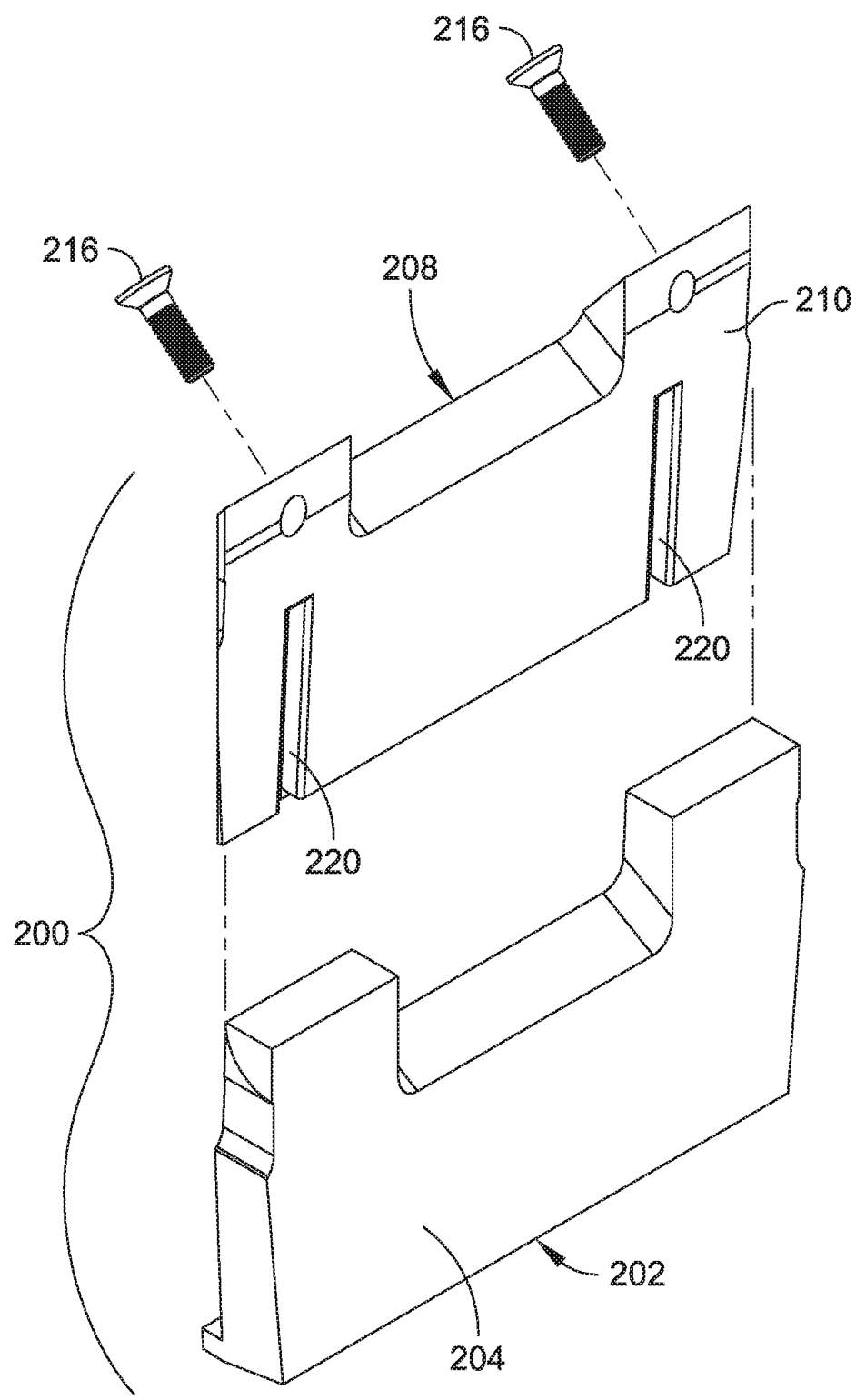
FIG. 10 is an isometric view illustrating various components of an example device that can implement embodiments of Replaceable Hardfacing.
Figure 11:
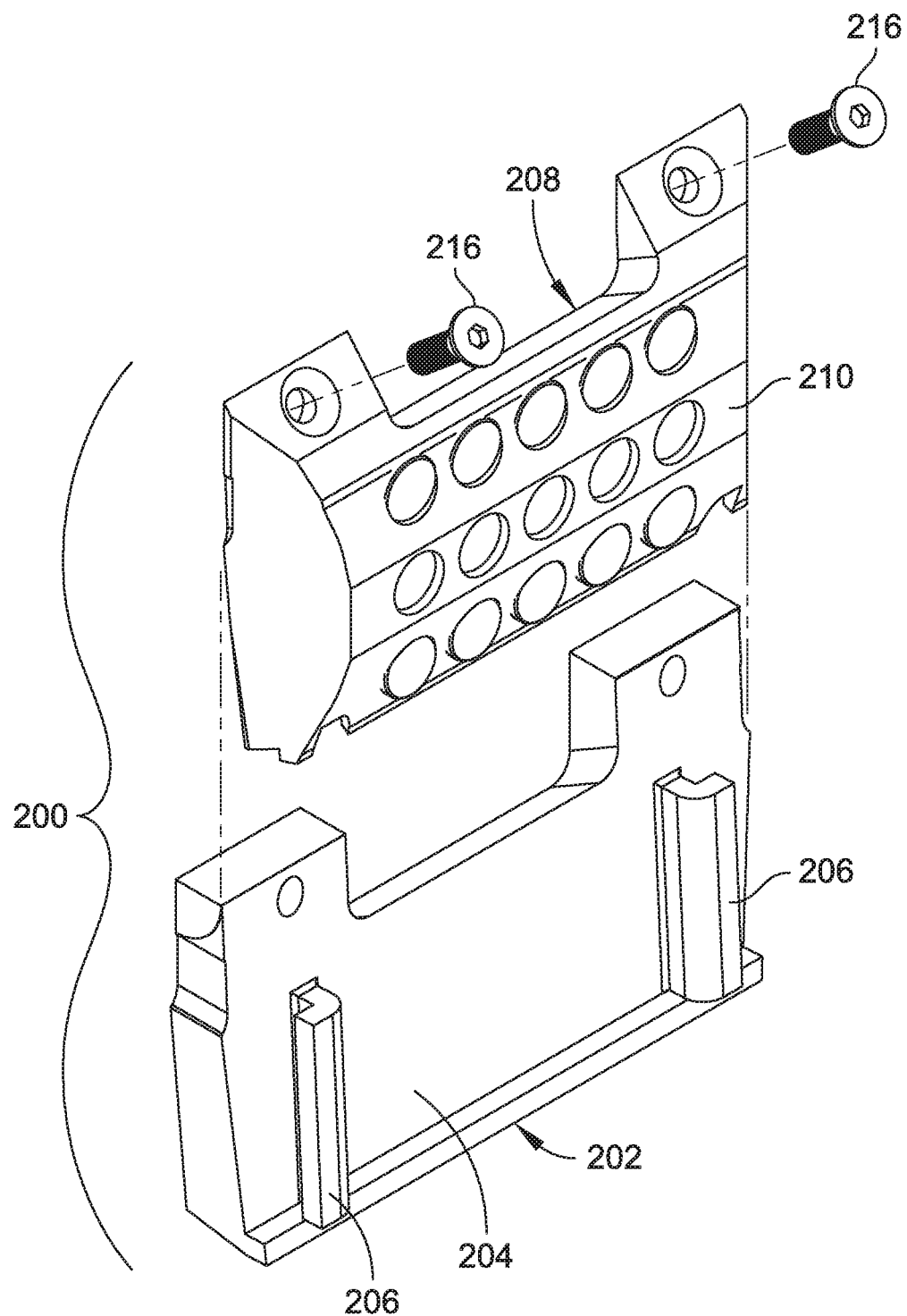
FIG. 11 is another isometric view of the components illustrated in FIG. 10.
Figure 12:
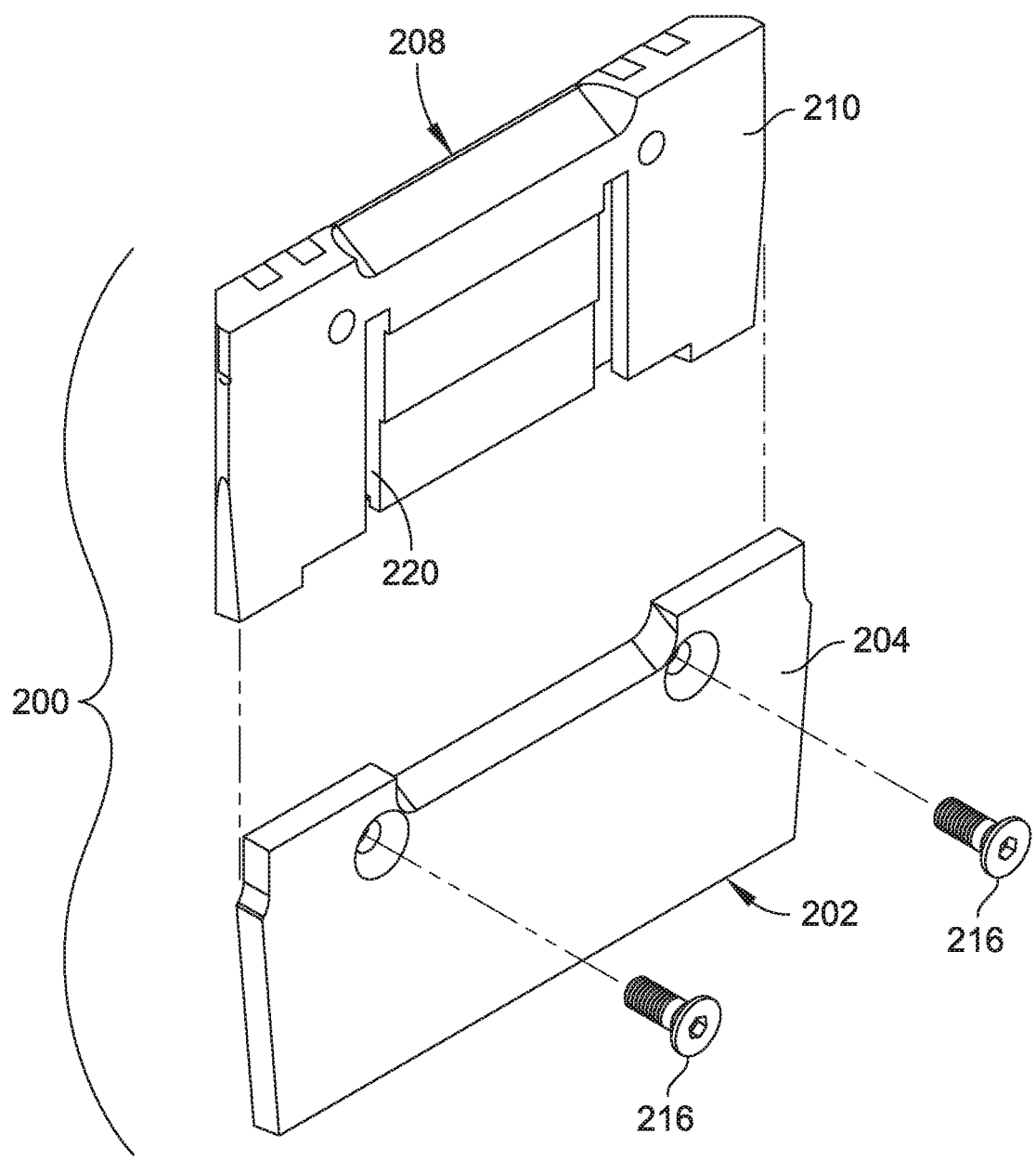
FIG. 12 is an isometric view illustrating various components of an example device that can implement embodiments of Replaceable Hardfacing.
Figure 13:
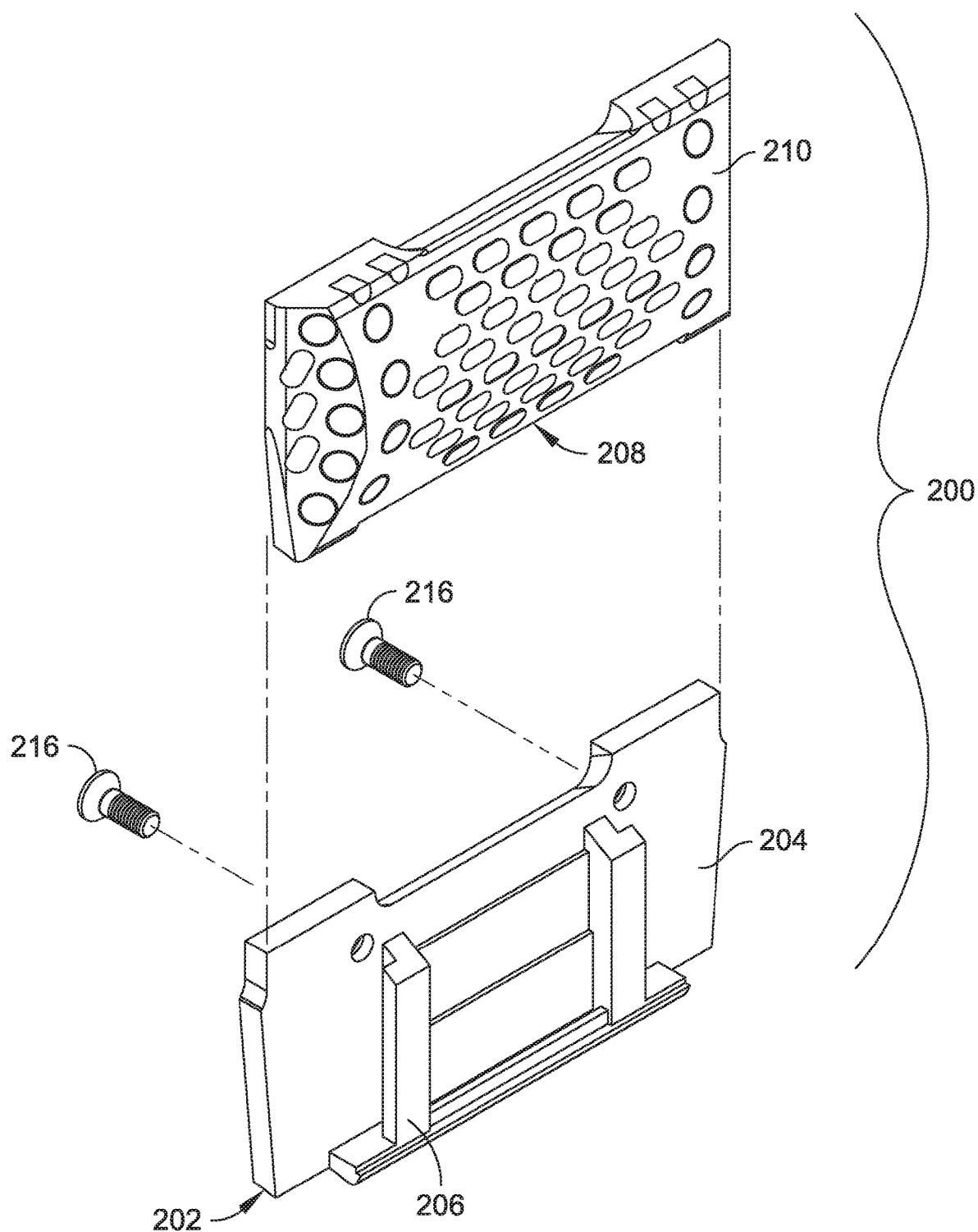
FIG. 13 is another isometric view of the components illustrated in FIG. 11.

Referring to FIGS. 8 and 9, the tool 200 can include a planar support surface 204 (e.g., pad, bearing surface, etc.) with one or more removable matrix hardfaces. In these examples, the mechanical registration features 206 have a positive draft so that the first removable matrix hardface 208 can be attached to the substrate 202 face-to-face. In some implementations, the pre-molded hardfacing material 210 can be brazed to the support surface 204, as described above. In other implementations, the first removable matrix hardface 208 can be mechanically attached to the substrate with one or more fasteners 216 (e.g., screws, bolts, pins, pegs, etc.). The first removable matrix hardface 208 can be mechanically detached (i.e., fasteners 216 removed) when the pre-molded hardfacing material 210 becomes worn. With reference to FIG. 8, the hardfacing material 210 can further include one or more slots 220 that are received by the mechanical registration features 206. With reference to FIGS. 10 and 11, the mechanical registration features 206 can include tabs that can be received by slots formed on the pre-molded hardfacing material 210. With reference to FIGS. 12 and 13, fasteners 216 can also be inserted through a pad from a side opposite the first removable matrix hardface 208 (e.g., to prevent and/or minimize exposure of the fasteners 216 to abrasion and/or erosion).

Figure 14:
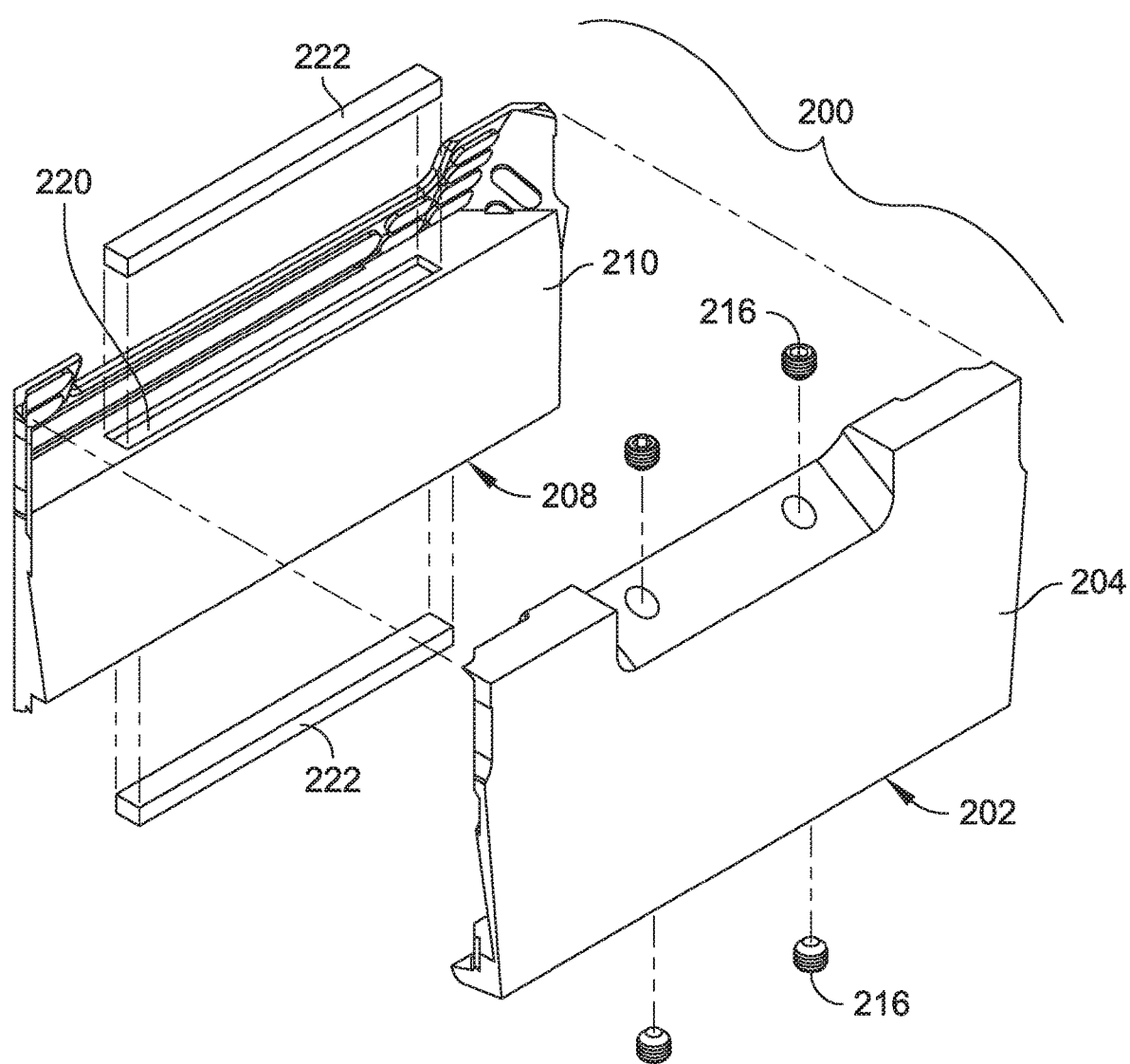
FIG. 14 is an isometric view illustrating various components of an example device that can implement embodiments of Replaceable Hardfacing.
Figure 15:
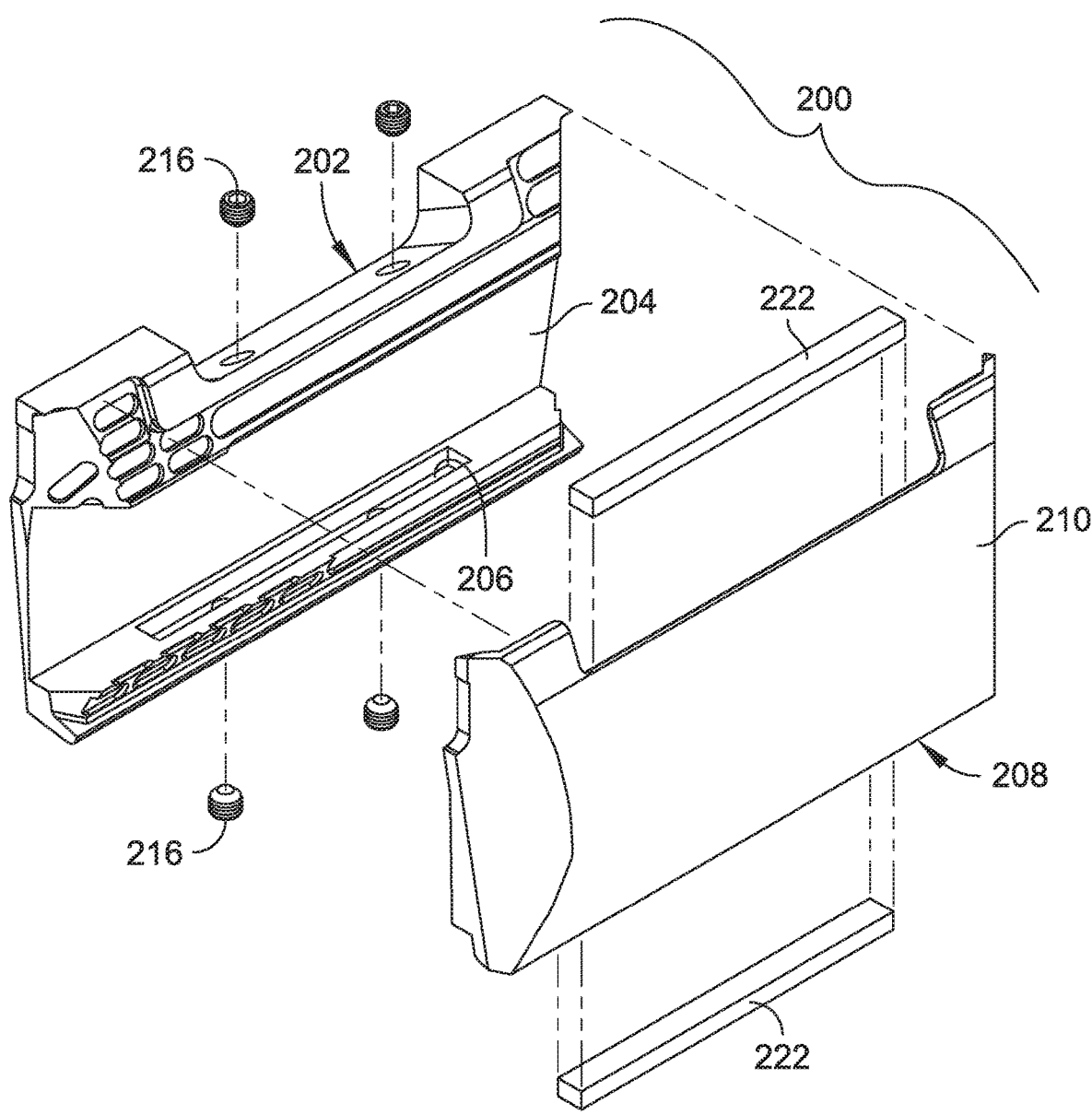
FIG. 15 is another isometric view of the components illustrated in FIG. 14.
Figure 16:
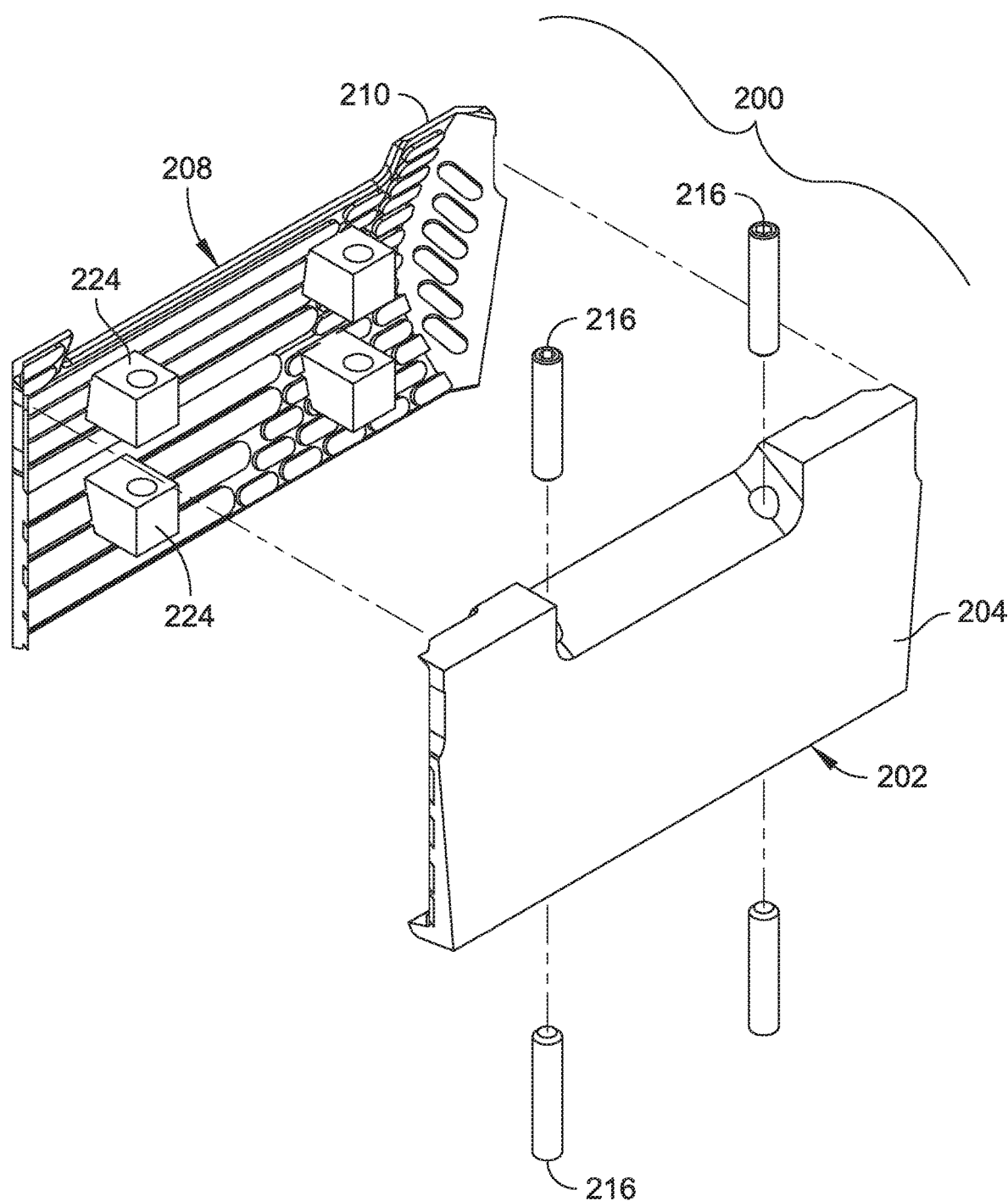
FIG. 16 is an isometric view illustrating various components of an example device that can implement embodiments of Replaceable Hardfacing.
Figure 17:
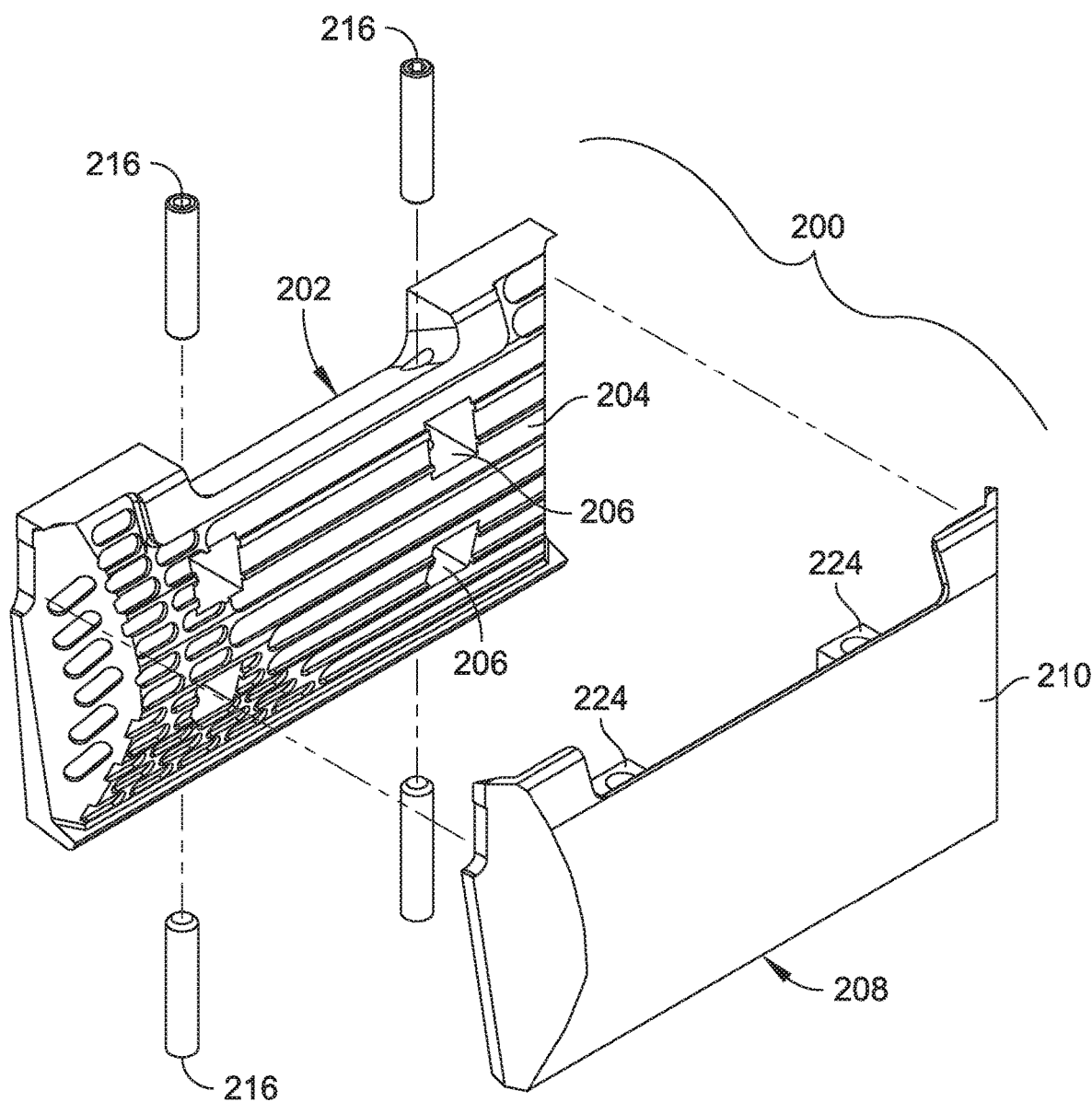
FIG. 17 is another isometric view of the components illustrated in FIG. 16.
Figure 18:
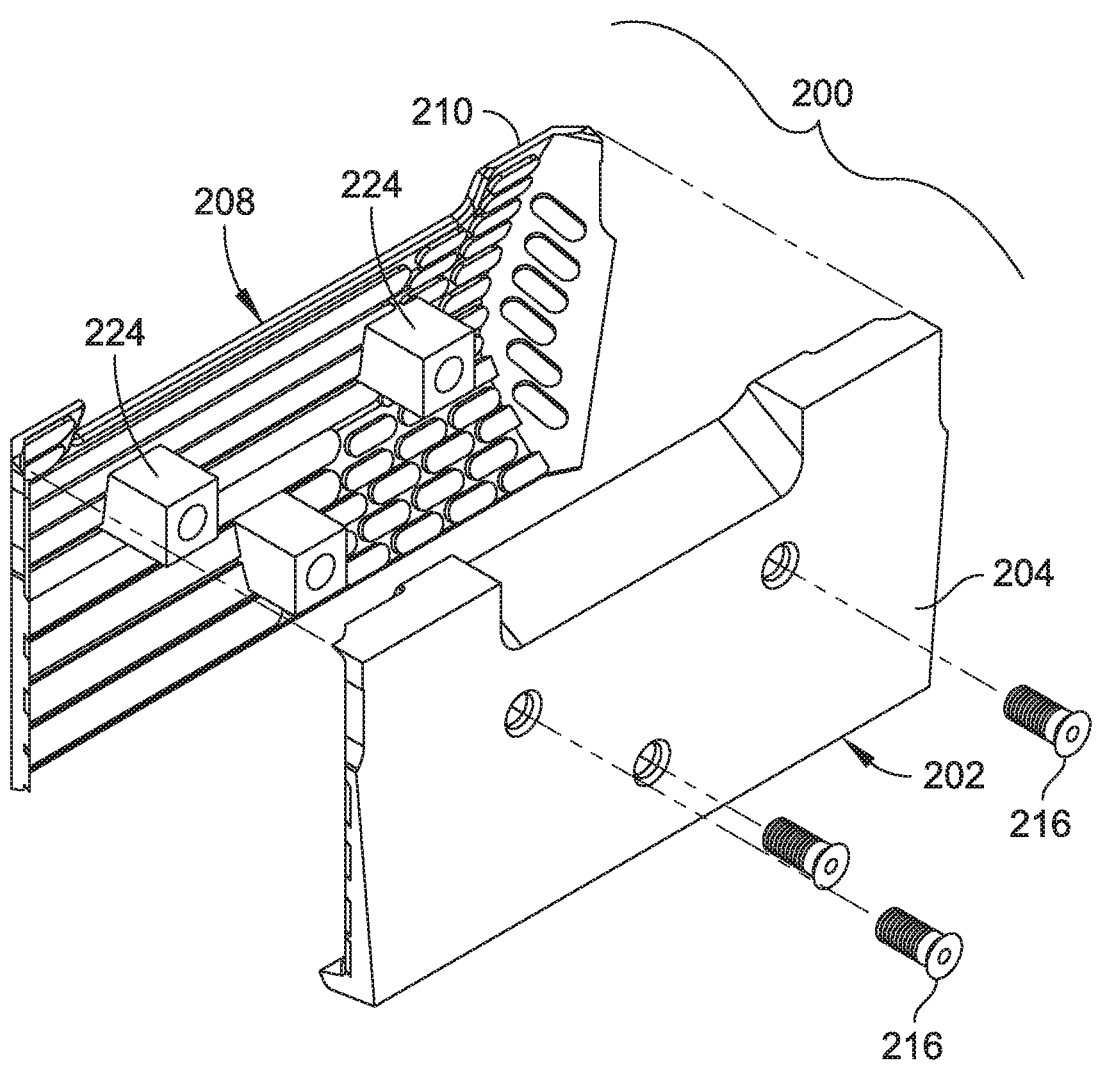
FIG. 18 is an isometric view illustrating various components of an example device that can implement embodiments of Replaceable Hardfacing.
Figure 19:
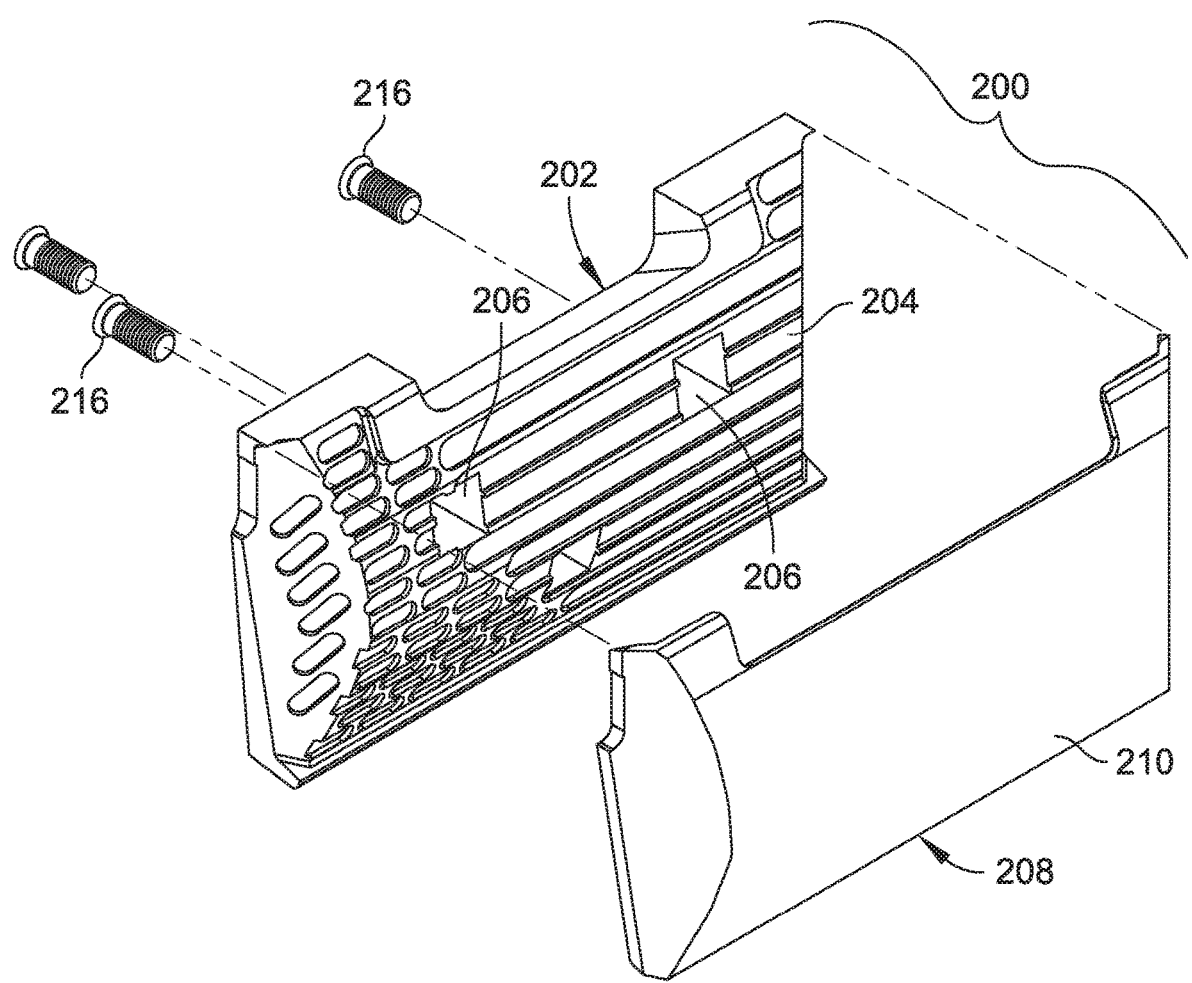
FIG. 19 is another isometric view of the components illustrated in FIG. 18.

Referring now to FIGS. 14 and 15, a tool 200 including one or more removable matrix hardfaces can be assembled using one or more rails 222. The pre-molded hardfacing material can include one or more slots 220 that can receive the rails 222. The mechanical registration features 206 can include corresponding cavities that receive the rails. The first removable matrix hardface 208 can be attached to the substrate 202 with fasteners 216 (e.g., screws, bolts, pins, pegs, etc.), which can bias the rails 222 into engagement with the mechanical registration features 206. The first removable matrix hardface 208 can be mechanically detached (i.e., fasteners 216 and rails 222 removed) when the hardfacing material 210 becomes worn.

Referring to FIGS. 16 through 19, other examples of tools 200 including planar support surfaces 204 (e.g., pad, bearing surface, etc.) and one or more removable matrix hardfaces are described. In these examples, the substrate 202 can have a positive draft so that the first removable matrix hardface 208 can be attached to the support surface 204 face-to-face. The hardfacing material 210 can include protrusions 224. The mechanical registration features 206 can include cavities, which can receive the protrusions 224. Then, fasteners 216 (e.g., screws, bolts, pins, pegs, etc.) can be inserted into the pad and through the protrusions 224 to secure the first removable matrix hardface 208 to the substrate 202. In some embodiments, the fasteners 216 can be inserted laterally through the substrate 202 (e.g., as described with reference to FIGS. 16 and 17), while in other embodiments, fasteners 216 can be inserted perpendicularly through the substrate 202 and into the first removable matrix hardface 208 (e.g., as described with reference to FIGS. 18 and 19). The first removable matrix hardface 208 can be mechanically detached (i.e., fasteners 216 removed) when the pre-molded hardfacing material 210 becomes worn.

Figure 20:
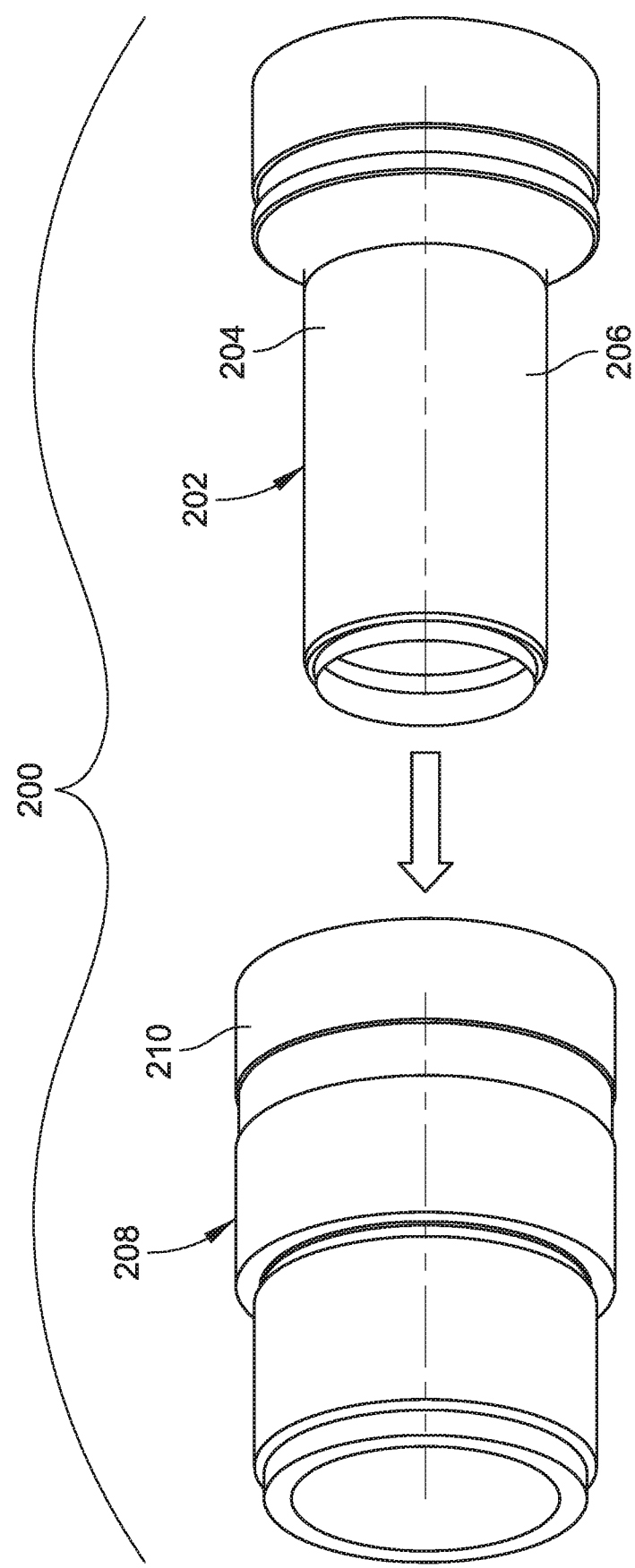
FIG. 20 is a perspective view illustrating various components of an example device that can implement embodiments of Replaceable Hardfacing.

Referring now to FIG. 20, a generally cylindrical tool 200 (e.g., radial bearing) with one or more removable matrix hardfaces is described. In some embodiments, the radial bearing can be used in a mud motor. However, this example is not meant to limit the present disclosure. In other embodiments, radial bearings with a removable matrix hardface can be used in other applications. As shown, the cylindrical tool 200 can include a substrate 202 and a first removable matrix hardface 208 with complementary cylindrical/tubular hard contact surfaces. For instance, the substrate 202 can include a generally cylindrical support surface 204 and a generally cylindrical mechanical registration feature 206. The removable matrix hardface 208 can include a complementary generally cylindrical pre-molded hardfacing material 210. The removable matrix hardface 208 can be slidably attached to the substrate 202, causing the generally cylindrical support surface 204 and the first removable matrix hardface 208 to wear against a mating generally cylindrical surface. In some embodiments, the first removable matrix hardface 202 can be formed using a tungsten carbide matrix, and may include one or more inserts (e.g., made of TSP or other diamond or ultra-hard materials). For example, the hardfacing material 210 is cast and/or molded as a continuous tubular sleeve. In some embodiments, the cylindrical contact surface and the tubular contact surface can be secured together using, for example, a shrink-fit process (e.g., by heating and/or cooling the cylindrical contact surface and/or the tubular contact surface). In other embodiments, the first removable matrix hardface 208 can be keyed and inserted onto a cylinder (e.g., in one continuous tubular sleeve, in multiple sections that form a tubular sleeve, in tiles, etc.). For example, the support surface 204 includes a generally cylindrical support surface 204 and a first removable matrix hardface 208 and a second removable matrix hardface 212 are to wear against a mating generally cylindrical surface. Further, wear bands can be fabricated in a similar manner.

Figure 21:
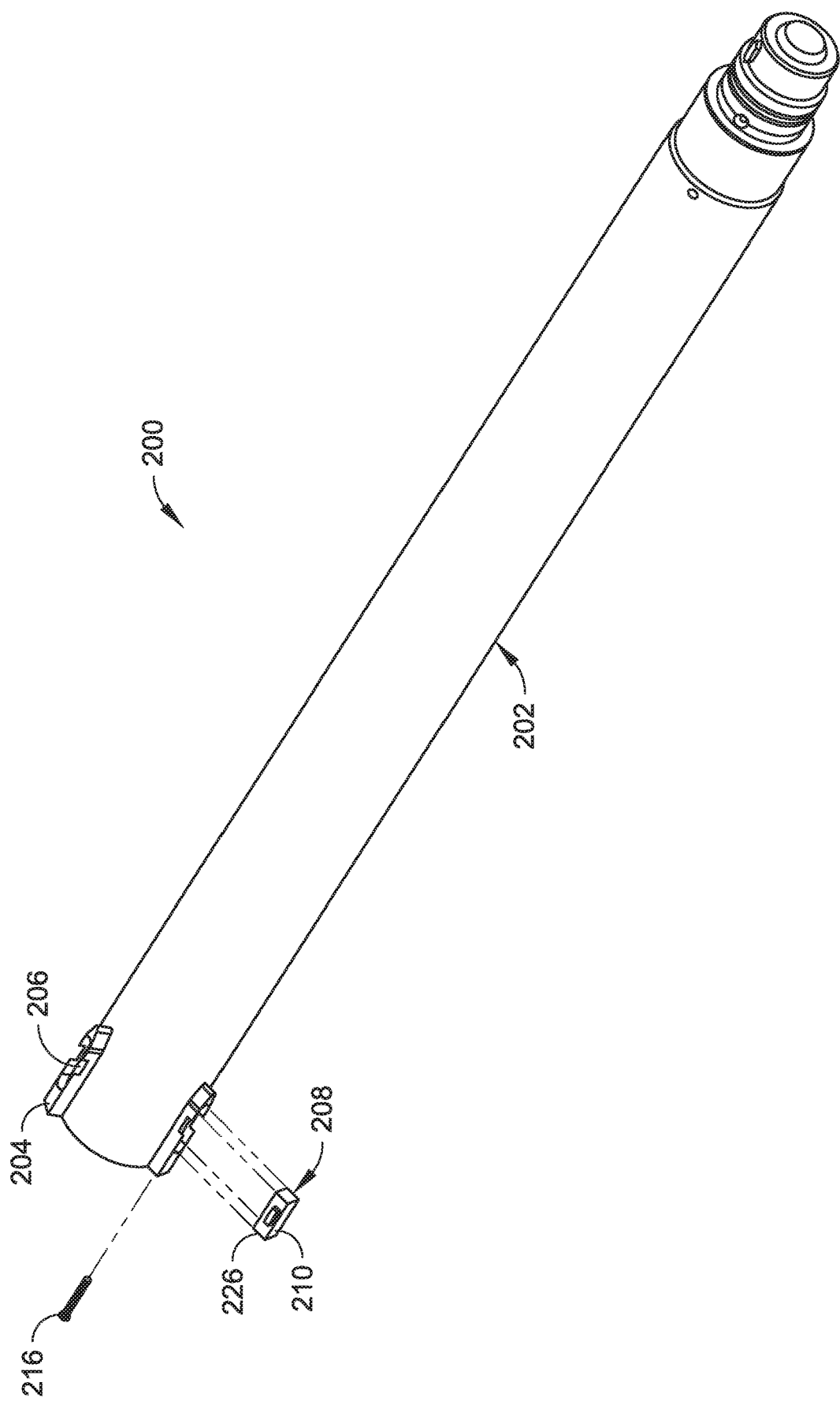
FIG. 21 is a perspective view illustrating various components of an example device that can implement embodiments of Replaceable Hardfacing.
Figure 22:
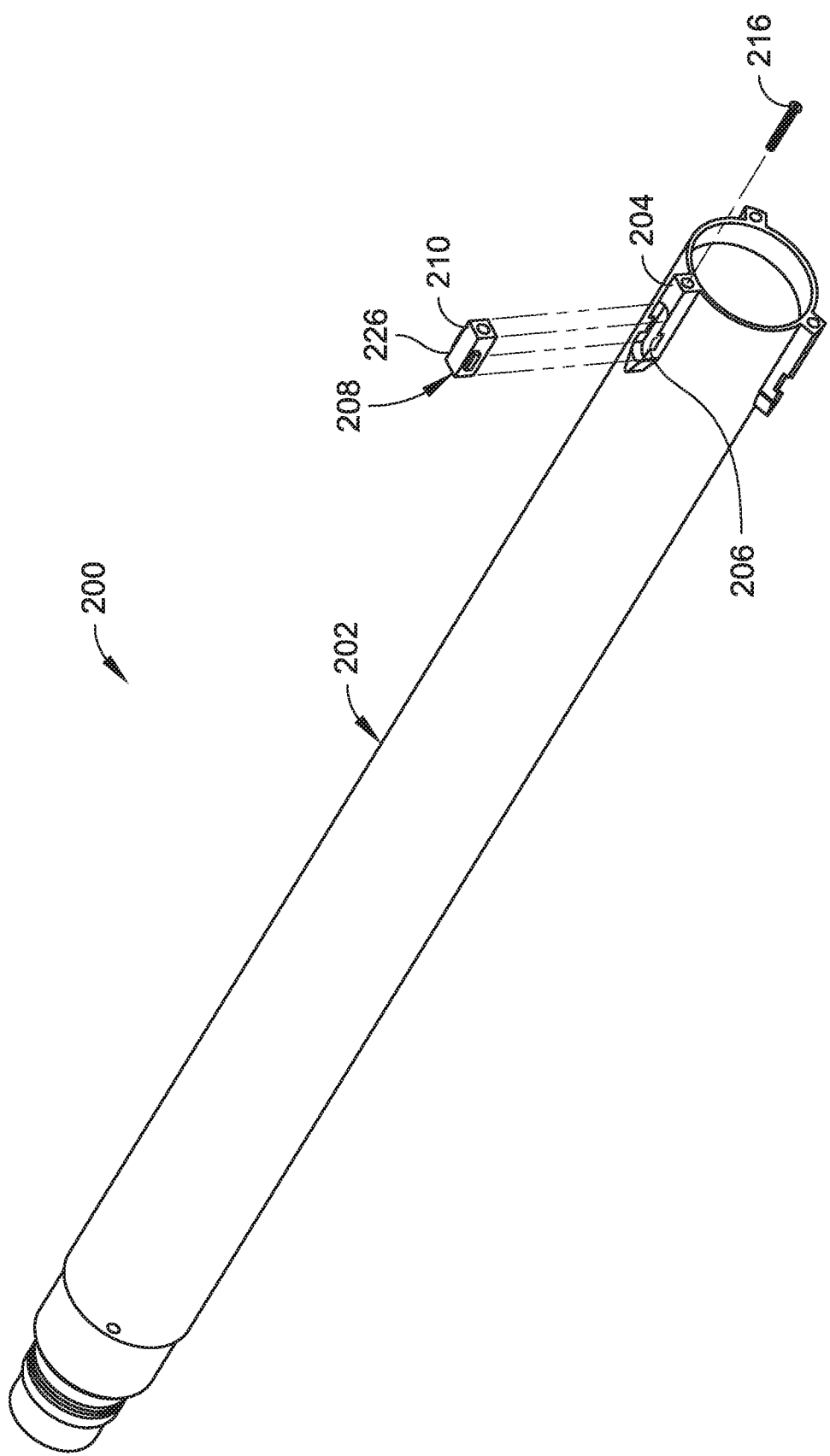
FIG. 22 is another perspective view of the components illustrated in FIG. 21.

With reference to FIGS. 21 and 22, one or more struts that hold a smaller tube concentric within a larger tube can be formed using one or more removable matrix hardfaces. For example, the tool 200 can include a tubular substrate 202 with one or more mechanical registration features 206 including cavities. The mechanical registration features 206 can receive one or more removable matrix hardfaces (e.g., a first removable matrix hardface 208) including a pre-molded hardfacing material 210 and a strut 226. The first removable matrix hardface 208 can be attached to the support surface 204 by one or more fasteners 216. For example, the support surface 204 and strut 226 can include openings that align when the first removable matrix hardface 208 is mated with the mechanical registration feature 206. The openings can receive the fastener 216, as illustrated in FIG. 22, holding the tube concentric within a collar.

In some embodiments, three-dimensional (3D) printed molds can be customized for each part of a removable matrix hardface 208, 212, and the profile of pad and/or stabilizer removable matrix hardface 208, 212 can be designed for a particular location. For example, extra protection (e.g., more inserts) can be included in certain areas, and/or the geometry of a contact area can be changed depending on formation hardness, and so on. In some embodiments, such techniques may reduce or eliminate the need for post-grinding of the removable matrix hardface 208, 212.

While sliding a removable matrix hardface 208, 212 to interface with a substrate 202 and/or joining a removable matrix hardface 208, 212 and a substrate 202 face-to-face have been described with some specificity, these examples are not meant to limit the present disclosure. In other embodiments, a removable matrix hardface 208, 212 can be mated with a substrate 202 at a different angle. Further, a removable matrix hardface 208, 212 and/or a substrate 202 can be keyed to provide a twist-and-lock configuration, and/or can include stops for positioning the removable matrix hardface 208, 212. In some embodiments, a removable matrix hardface 208, 212 can be molded directly onto a substrate 202. For example, an insert (e.g., a metallic nugget) can be inserted into a mold, and the removable matrix hardface 208, 212 can be co-molded with the insert. Then, the tool 200 can be removed from the mold, and possibly further processed. For example, the tool 200 can be tapped with threads to distribute stress, and so on.

Although only a few example embodiments have been described in detail above, those skilled in the art will readily appreciate that many modifications are possible in the example embodiments without materially departing from Replaceable Hardfacing. Features shown in individual embodiments referred to above may be used together in combinations other than those which have been shown and described specifically. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke "means plus function" for any limitations of any of the claims herein, except for those in which the claim expressly uses the words 'means for' together with an associated function.

What is claimed is:

1. A tool comprising:
   a substrate including a support surface and at least one mechanical registration feature; and
   a removable wear surface including a matrix material shaped to be received by the at least one mechanical registration feature of the substrate, wherein the removable wear surface is mechanically attachable to the substrate with a fastener so that the at least one mechanical registration feature registers the removable wear surface, and the removable wear surface is mechanically detachable by removing the fastener from the substrate when the removable wear surface is worn, wherein the fastener is inserted through the substrate from a side opposite the removable wear surface.

2. The tool as recited in claim 1, wherein the removable wear surface comprises a tungsten carbide matrix material.

3. The tool as recited in claim 1, wherein the substrate is keyed for registering the removable wear surface.

4. The tool as recited in claim 1, wherein the removable wear surface is attachable to the substrate using a plurality of fasteners.

5. The tool as recited in claim 1, further comprising a second removable wear surface to be registered by the substrate, wherein the removable wear surface and the second removable wear surface overlap when registered by the substrate.

6. The tool as recited in claim 1, wherein the support surface includes a generally cylindrical support surface and the removable wear surface is configured to wear against a mating generally cylindrical surface.

7. The tool as recited in claim 1, wherein at least one of the substrate or the removable wear surface is secured using a shrink-fit process.

8. A tool comprising:
   a substrate including a support surface and at least one mechanical registration feature; and
   a removable wear material including matrix material with at least one slot shaped to receive the at least one mechanical registration feature of the substrate, wherein the removable wear material is attached to the substrate so that the at least one mechanical registration feature registers the removable wear material.

9. The tool as recited in claim 8, wherein the removable wear material comprises a tungsten carbide matrix.

10. The tool as recited in claim 8, wherein the substrate is keyed for registering the removable wear material.

11. The tool as recited in claim 8, wherein the removable wear material is attached to the substrate using at least one of a braze, an adhesive, or a fastener.

12. The tool as recited in claim 8, further comprising a second removable wear material comprising a matrix material registered by the substrate, wherein the removable wear material and the second removable wear material overlap when registered by the substrate.

13. The tool as recited in claim 8, wherein the support surface includes a generally cylindrical support surface and the removable wear material is to wear against a mating generally cylindrical surface.

14. The tool as recited in claim 8, wherein at least one of the substrate or the removable wear material is secured using a shrink-fit process.

15. The tool as recited in claim 8, wherein the removable wear material is molded onto the substrate.

16. A tool comprising:
   a substrate including a support surface and at least one mechanical registration feature;
   a first removable wear material comprising a matrix material shaped to be received by the at least one mechanical registration feature of the substrate, wherein the first removable wear material is mechanically attachable to the substrate so that the at least one mechanical registration feature registers the first removable wear material, and wherein a mechanical fastener connects the first removable wear material to the substrate from a side opposite the first removable wear surface; and
   a second removable wear material comprising a matrix material registered by the substrate, the first removable wear material and the second removable wear material are to overlap when registered by the substrate.

17. The tool as recited in claim 16, wherein the substrate is keyed for registering the first removable wear material.

18. The tool as recited in claim 16, wherein the first removable wear material is attachable to the substrate using at least one of a braze, an adhesive, or a fastener.

19. The tool as recited in claim 16, wherein the support surface includes a generally cylindrical support surface and the first removable wear material and the second removable wear material are to wear against a mating generally cylindrical surface.

20. The tool as recited in claim 16, wherein at least one of the substrate or the first removable wear material is to be secured using a shrink-fit process.

* * * * *